United States Patent [19]
Yamaguchi et al.

[11] Patent Number: 5,801,746
[45] Date of Patent: Sep. 1, 1998

[54] IMAGE FORMING APPARATUS HAVING A PLURALITY OF MIRROR MEMBERS EACH CAPABLE OF MOVING IN A PARALLEL OR ROTARY DIRECTION

[75] Inventors: Masao Yamaguchi, Kawaguchi; Takashi Shiraishi, Sagamihara, both of Japan

[73] Assignee: Kabushiki Kaisha Toshiba, Kawasaki, Japan

[21] Appl. No.: 649,238

[22] Filed: May 17, 1996

[30] Foreign Application Priority Data

May 18, 1995 [JP] Japan .................. 7-119806

[51] Int. Cl.$^6$ ............................................. G02B 26/08
[52] U.S. Cl. ................................................ 347/259
[58] Field of Search .......................... 347/259, 256, 347/260, 261, 137, 115, 242, 241, 243; 359/217, 202, 203, 204, 206, 210, 216

[56] References Cited

U.S. PATENT DOCUMENTS

| | | | |
|---|---|---|---|
| 5,008,686 | 4/1991 | Saito | 347/241 |
| 5,181,137 | 1/1993 | Koide | 347/232 X |
| 5,438,450 | 8/1995 | Saito | 359/196 |
| 5,457,550 | 10/1995 | Baba et al. | 359/216 |
| 5,485,194 | 1/1996 | Tateoka | 347/242 X |

*Primary Examiner*—Edward Tso
*Attorney, Agent, or Firm*—Foley & Lardner

[57] ABSTRACT

The present invention is to provide image forming apparatus comprising an optical exposer unit capable of forming a color image having no color shift. The optical exposer unit includes a plurality of mirrors reflecting laser beams reflected by a reflector and passed through first to third image-form lenses in predetermined order. At least one of the respective laser beams reflected by each of the respective mirrors toward a photosensitive drum is guided to the photosensitive drum through a transparent plate provided to form an angle of 90°−0.3° and/or 90°+0.3° with each of the laser beams.

18 Claims, 11 Drawing Sheets

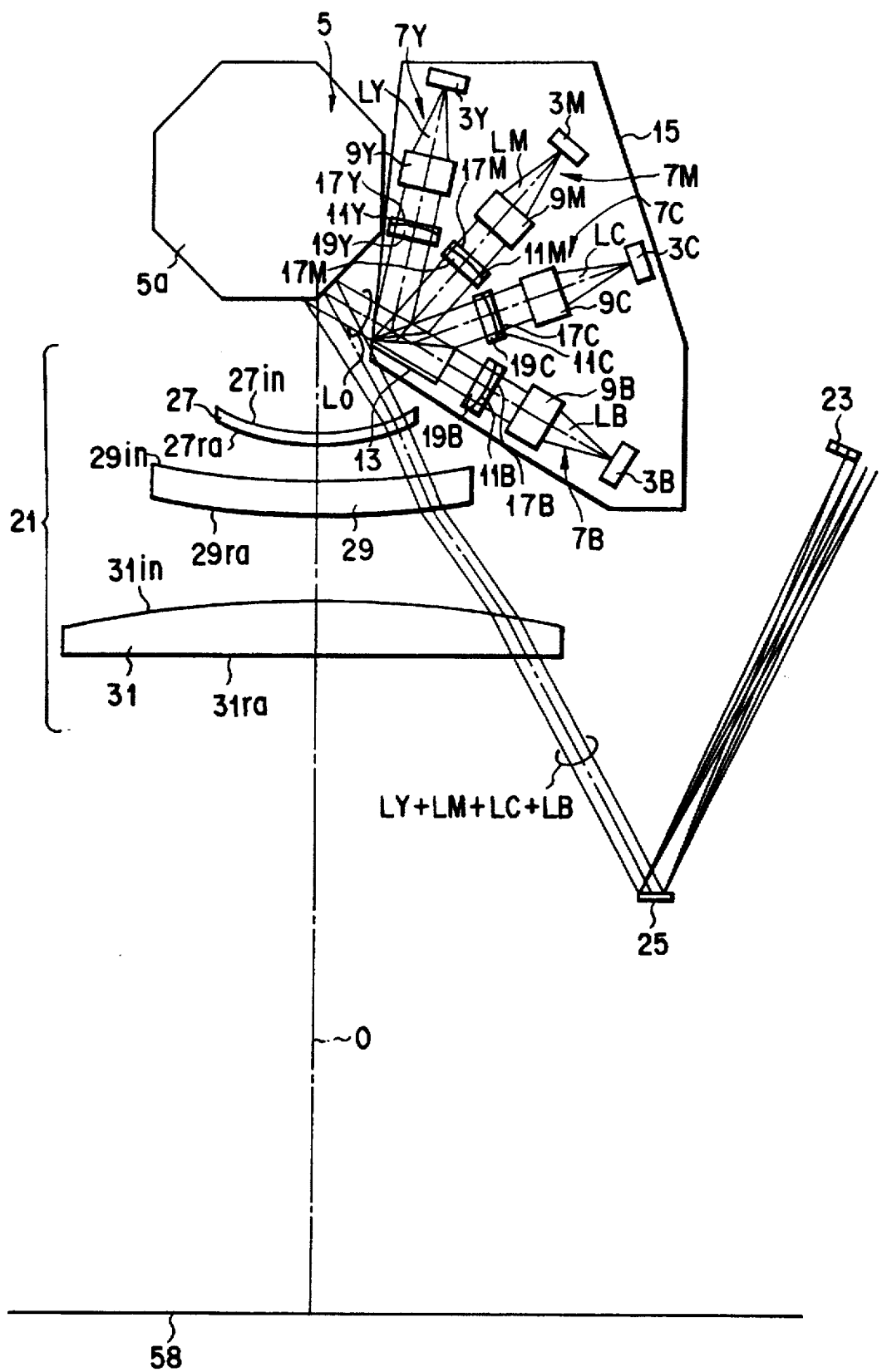
F I G. 2

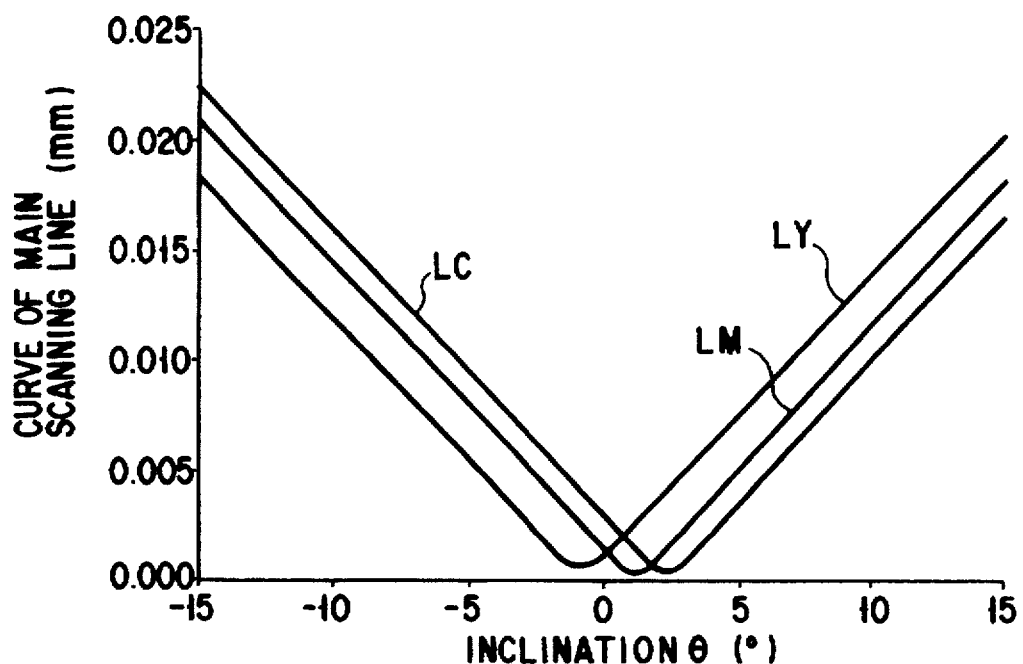
F I G. 10
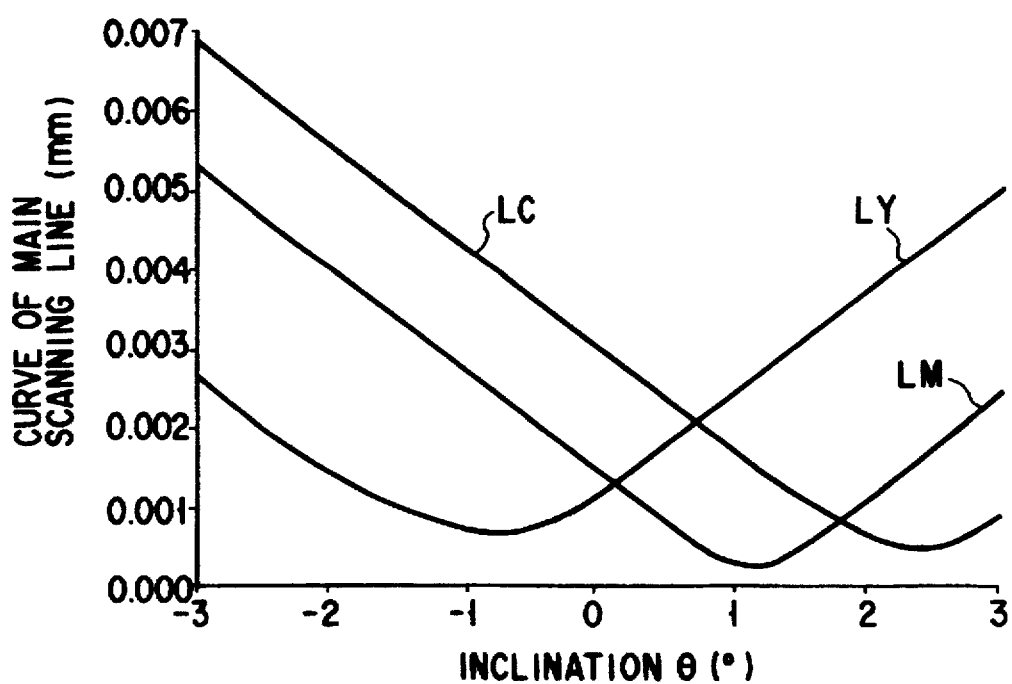
F I G. 11

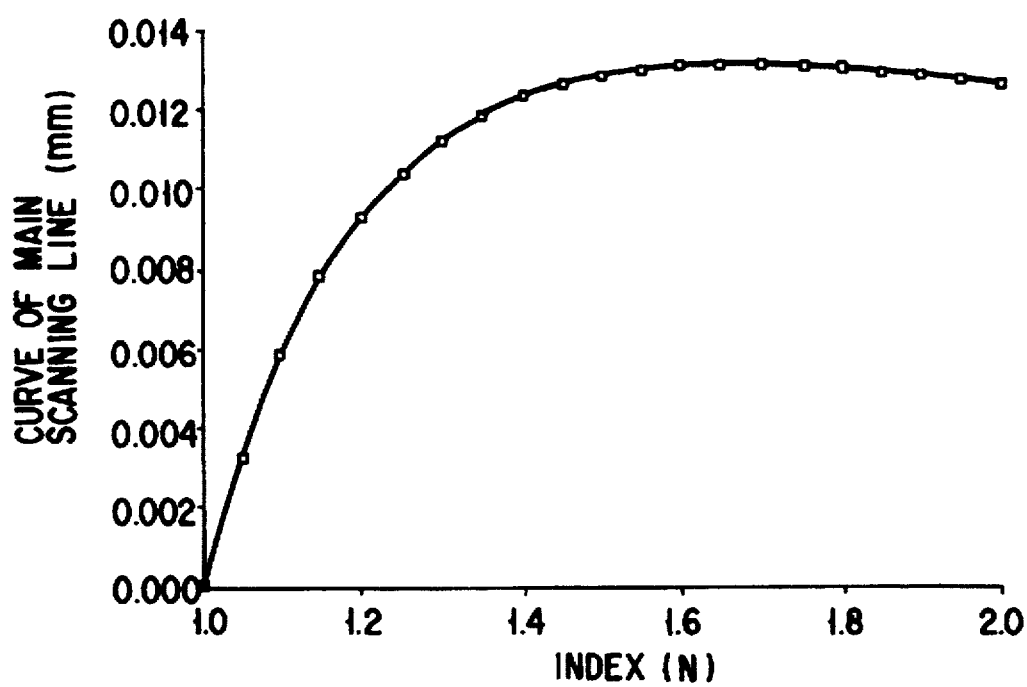
F I G. 12
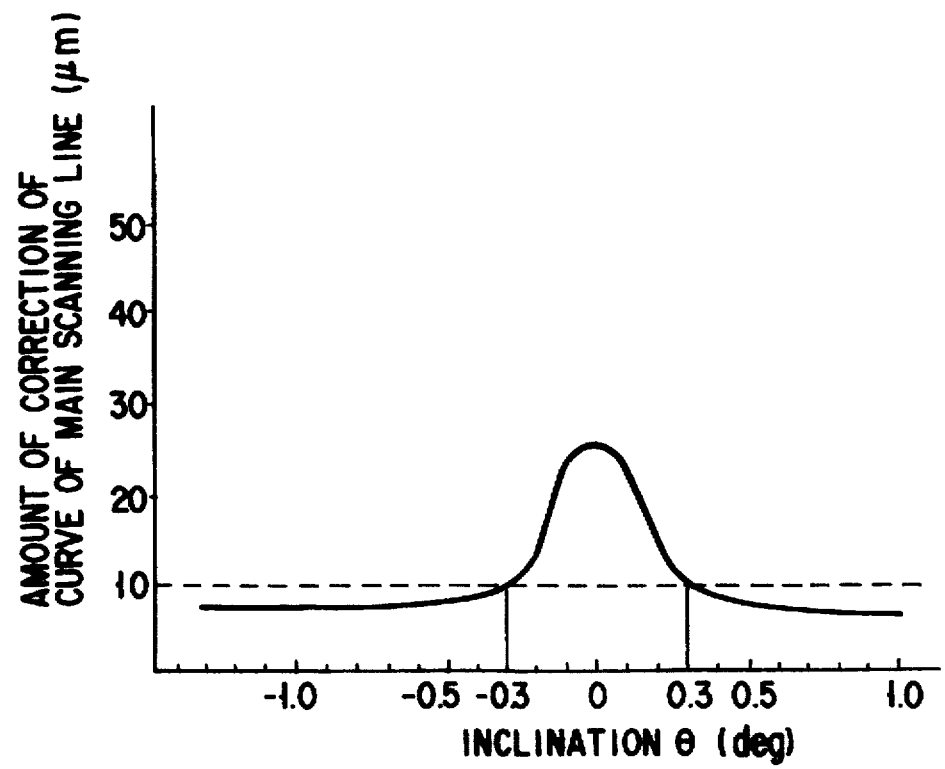
F I G. 13

IMAGE FORMING APPARATUS HAVING A PLURALITY OF MIRROR MEMBERS EACH CAPABLE OF MOVING IN A PARALLEL OR ROTARY DIRECTION

BACKGROUND OF THE INVENTION

1. Field of the Invention

This invention relates to an image forming apparatus such as a color printer apparatus, a high speed copying machine, and a color copying machine, each having a plurality of drums.

2. Description of the Related Art

In an image forming apparatus such as a color printer and a color copying machine having a plurality of drums, there are used a plurality of image forming sections for forming an image in accordance with color components, which is color-separated, and a laser exposer unit for providing a plurality of image data, i.e., a plurality of laser beams of each of color components.

The laser exposer unit comprises a semiconductor laser element, serving as a light source, a first lens group for reducing a diameter of a laser beam emitted from the laser element, a reflector for continuously reflecting the laser beam whose diameter is reduced to a direction perpendicular to a direction where a recording medium is transferred, and a second lens group for image-forming the laser beam reflected by the reflector on a predetermined position of the recording medium.

As this type of the laser exposer unit, there is known an example in which a plurality of laser exposer units are arranged to correspond to each of the image forming sections in accordance with the image forming apparatus to be applied. Also, there is known an example of a multi-beam laser exposer unit, which is structured to emit a plurality of laser beams.

Japanese Patent Application KOKAI Publication No. 5-83485 discloses such a multi-beam laser exposer unit using an N set of lens groups, which includes the semiconductor laser element, serving as a light source, a cylinder lens, and a fθ lens, and N/2 set of deflectors wherein the number of beams is N. More specifically, in the example disclosed in Japanese Patent Application KOKAI Publication No. 5-83485, in the case of four laser beams, four sets of lens groups and two sets of deflectors are used.

Separating from the above example, the following example is proposed.

More specifically, first and second fθ lens groups are prepared. The number of the first fθ lens, which is portioned close to the deflector, is only one. Then, all laser beams reflected by the deflector are made incident thereto. On the other hand, the number of the second fθ lens, which are positioned away from the deflector, are provided to correspond to all laser beams. More specifically, in this example, in the case of four laser beams, four sets of second fθ lenses are provided.

Moreover, Japanese Patent Application KOKAI Publication No. 62-232344 discloses the following method.

More specifically, only one set of fθ lens group is provided. A toric surface is formed on at least one surface of the lens surfaces of the fθ lens group. Then, all laser beams are made incident to the same fθ lens.

Furthermore, Japanese Patent Application KOKAI Publication No. 5-34612 discloses the following method.

More specifically, by use of a plurality of half-mirrors, four laser beams, which can be regarded as substantially one laser beam, are superimposed on each other in order to be guided to the deflector.

Japanese Patent Application KOKAI Publication No. 5-83485 discloses a unit corresponding to four sets of laser exposer units that is incorporated into one housing. As compared with the case using a plurality of exposer units, the space, which is occupied by the laser exposer unit, is reduced in this example. However, from the viewpoint of the single laser exposer unit, the cost of parts and that of the assembly rise. Also, the size and weight rise due to increase in the number of lenses or the number of mirrors. Moreover, it is known that the curve of the main-scanning line of the laser beam of each color component, or the deviation of the aberration characteristic on the image-forming surface such as fθ characteristic, becomes uneven due to the error of the shape of the fθ lens or the position error of the attachment. As a result, a miss-alignment of color components is generated at the time of a color image forming.

As an example in which the first fθ lens is used in common to the respective laser beams, the second fθ lens, which is provided in each of the laser beams, is shown. However, due to the error of the shape of the fθ lens or the position error of the attachment, the same disadvantage as in the example described in Japanese Patent Application KOKAI Publication No. 5-83485, is generated.

In the example described in Japanese Patent Application KOKAI Publication No. 62-232344, since only the toric surface whose shape is not optimized is formed, there is a problem in which a curve of the main scanning line is generated in any one of the plurality of the laser beams. In Japanese Patent Application KOKAI Publication No. 62-232344, there is proposed that a part of the laser beam directing to the deflector is controlled to be directed toward the optical axis. However, it is difficult to sufficiently compensate for the aberration characteristics in all image forming areas. Moreover, in Japanese Patent Application KOKAI Publication No. 62-232344, the amount of the refractive index of the lens, formed of plastic, is relatively largely changed by the change of temperature. Due to this, there is generated a problem in which the field curve and the curve of the main scanning line or fθ characteristics are largely varied under the large range of environmental conditions, particularly, the change of the temperature condition. In this example, various conditions such as a chromatism in the entire areas of the sub-scanning direction, the field curve, distortion of the image surface and the horizontal magnification must be satisfied. Due to this, there is a problem in which the number of lenses must be increased. Also, in this example, accuracy of the housing must be extremely high to ensure degree of parallelization of the main scanning line of each of the laser beams. Due to this, the manufacturing cost is increased.

In each of the plurality of image forming sections, in order to guide the respective main scanning lines of the respective laser beams emitted from the laser element to be parallel to each other, an angle error of each of the mirrors is multiplied when the number of the mirrors is increased.

Or, extremely high accuracy of the housing is required. Due to this, the angle of each of the mirrors must be accurately adjusted. Thereby, the inclination of the main scanning line, which is caused by the indication of the rotational axis of the deflector or the inclination around the optical axis of the lens, can be corrected. However, the inclination of the main scanning line, which is caused when the mirror is shifted in parallel, cannot be corrected by the above-mentioned adjustment. If the inclination of the main scanning line is corrected by only the adjustment of the mirror position, the relative position is shifted from the design value. Then, curvature of the image surface is deteriorated.

In consideration of the above-mentioned points, it is recognized that the following points are useful to reduce the size of the multi-beam laser exposer unit and the manufacturing cost.

More specifically, only one set of the image-forming lens or fθ lenses is provided to all laser beams. Moreover, the optical path of the laser beam, which directs to the photosensitive drum after passing through the fθ lens, that is, the laser beam is bent by the plurality of the reflection mirrors.

However, in a case where the plurality of the reflection mirrors is provided to be movable to either the rotational direction or the parallel moving direction, it is substantially difficult to adjust both parallelism and an amount of defocus in connection with the respective laser beams directing to the photosensitive drum after passing through the fθ lens.

SUMMARY OF THE INVENTION

An object of the invention is to provide an image forming apparatus, which can form a color image having no color shift.

Another object of the invention is to provide an optical laser exposer unit which can optimize a characteristic of each of color components.

According to a first aspect of the present invention, there is provided an optical unit comprising: means for scanning a plurality of laser beams to an object to be scanned; means, having at least one of lens means, for focusing the plurality of the laser beams to pass through the lens means toward the object; and a plurality of mirror members, each mounted on a backward portion of the focusing means and arranged against each of the plurality of the laser beams, the plurality of mirror members are capable of moving to at least one of parallel and rotary directions.

According to a second aspect of the present invention, there is provided an optical exposer unit comprising: means for scanning a plurality of laser beams to an object to be scanned; and image-forming means for image-forming the laser beams scanned by the scanning means at a predetermined position of the scanning object, the image-forming means including: optical means, having a group of lenses, for providing a predetermined optical characteristic to each of the laser beams; a plurality of reflecting means provided between the optical means and the scanning object so as to correspond to each of the laser beams; and a plurality of glass plates provided to correspond to each of the reflecting means for guiding the plurality of laser beams so as to cross each of the laser beams reflected by the reflecting means at a predetermined angle.

According to a third aspect of the present invention, there is provided an optical exposer unit comprising: a first light source for emitting a first laser beam corresponding to a first image; a second light source for emitting a second laser beam corresponding to a second image; first optical means for combining the first and second laser beam with each other to be a light ray group serving as one flux of light ray; means for scanning the light ray group obtained by the first optical means to an object to be scanned; second optical means for separating the light ray group passed through the scanning means into the first and second laser beams, and providing a predetermined optical characteristic to each of the first and second laser beams such that each of the first and second laser beams has a predetermined cross sectional shape when each of the first and second laser beams reaches the scanning object; means for reflecting the laser beams passed through the second optical means onto the scanning object; and third optical means, provided at a predetermined angle to each of the laser beams reflected by the reflecting means, for controlling the degree of curve of each of the laser beams being generated in a direction perpendicular to a light scanning direction where the laser beams are scanned by the scanning means to be in a predetermined range.

According to a fourth aspect of the present invention, there is provided an image forming apparatus comprising: a plurality of image carrier members; an optical exposer unit having: a plurality of light sources provided to correspond to each of the image carrier members; means for scanning each of laser beams emitted from the light sources to each of the corresponding image carrier members; image-forming means for image-forming the laser beams scanned by the scanning means at a predetermined position of the image carrier member, the image-forming means including: optical means having a set of lenses for providing a predetermined optical characteristic to each of the laser beams; a plurality of reflecting means provided between the optical means and the scanning object so as to correspond to each of the laser beams; and a plurality of glass plates provided to correspond to each of the reflecting means for guiding the plurality of laser beams so as to cross each of the laser beams reflected by the reflecting means at a predetermined angle; and developing units for supplying developer to latent images formed onto each of image carrier members by the optical exposer unit so as to form developing images.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a schematic cross sectional view of an optical laser exposer unit used in the color image forming apparatus of FIG. 1;

FIGS. 9 to 11 are graphs each showing a relationship between the inclination of the parallel plate glass member of FIG. 7 in the sub-scanning direction and a curve of the main scanning line of the laser beam, which is passed through first to third image-forming lenses;

FIG. 12 is a graph showing a relationship between the inclination of the parallel plate glass member of FIG. 7 in the sub-scanning direction and indexes of the parallel glass plate;

FIG. 13 is a graph showing an amount of correction of the curve of the main scanning direction against an angle at which the parallel plate glass member of FIG. 7 is inclined;

DETAILED DESCRIPTION OF THE PREFERRED EMBODIMENTS

Embodiments of the present invention will be explained with reference to the drawings.

Figure 1:
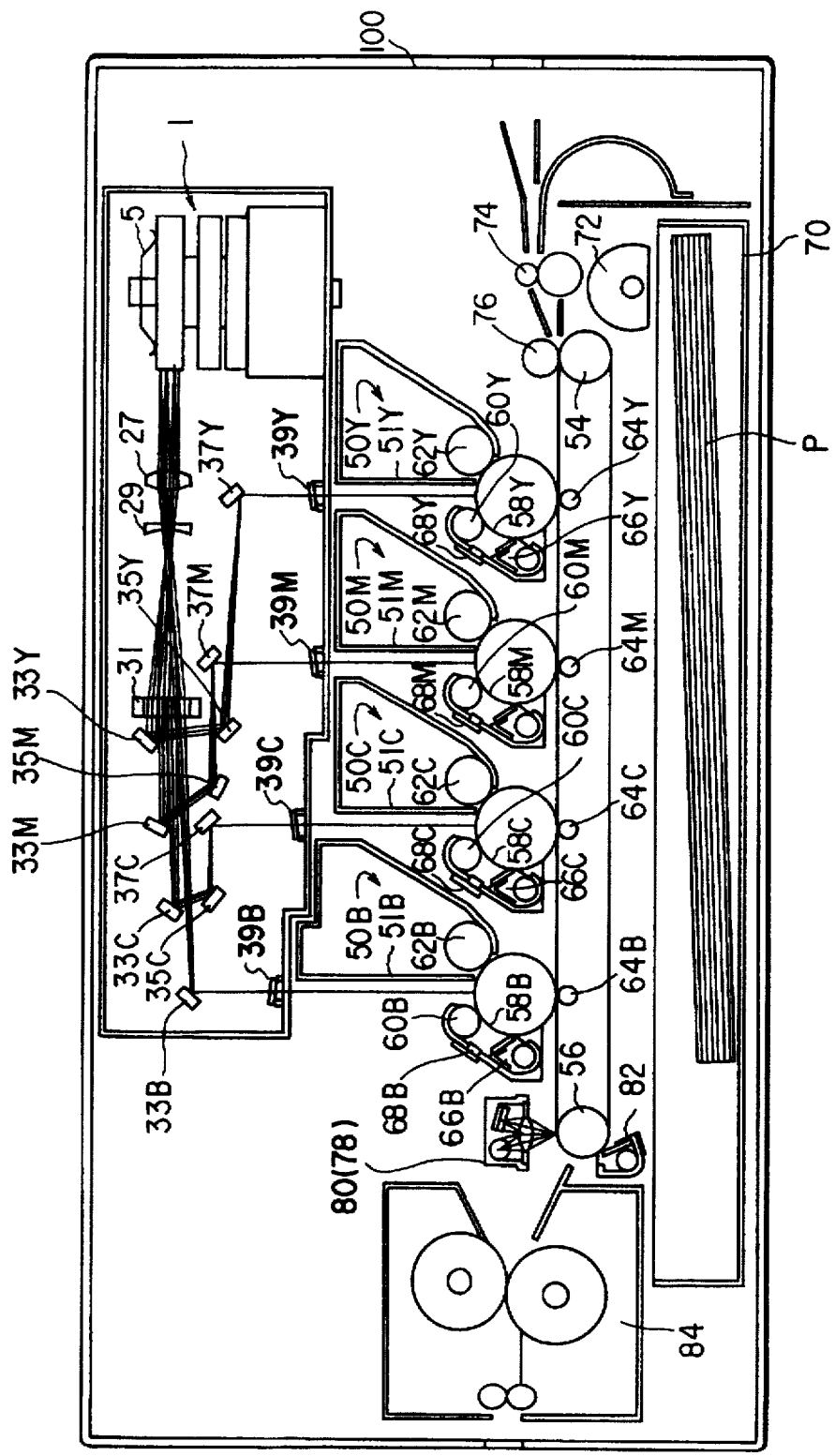
FIG. 1 is a schematic cross sectional view of a color image forming apparatus of an embodiment of the present invention.

FIG. 1 is a front cross sectional view of a color image forming apparatus of a quadruple-drum system having a laser exposer unit of the present invention.

An image forming apparatus 100 has first to fourth image forming units 50Y, 50M, 50C, and 50B for forming an image of each of components, which are color-separated into Y (Yellow), M (Magenta), C (Cyan), and B (Black).

The respective image forming units 50 are provided under a laser exposer unit 1 in series in order of 50Y, 50M, 50C, and 50B so as to correspond to the position where the laser beams LY, LM, LC, LB corresponding to the respective color components are emitted through the respective third mirrors 37Y, 37M, 37C, and a mirror 33B.

A transfer belt 52 is provided under the respective image forming units 50 to transfer an image formed by the respective image forming units 50Y, 50M, 50C, and 50B.

The transfer belt 52 is stretched onto a belt drive roller 56 and a tension roller 54, and rotated at a predetermined speed in a direction where the belt drive roller 56 is rotated.

The respective image forming units 50Y, 50M, 50C, and 50B include photosensitive members 58Y, 58M, 58C, and 58B. The photosensitive members 58Y, 58M, 58C, and 58B, which are shaped like a cylindrical drum to be rotatable in a direction of an arrow, form an electrostatic latent image corresponding to each image.

There are arranged charge units 60 (Y, M, C, B), developing units 62 (Y, M, C, B), transfer units 64 (Y, M, C, B), cleaners 66 (Y, M, C, B), and discharge units 69 (Y, M, C, B) around the respective photosensitive members 58Y, 58M, 58C, and 58B in order of the rotational direction of the photosensitive members 58 (Y, M, C, B).

Each of the charge units 60 provides a predetermined voltage on the surface of each of the respective photosensitive members 58 (Y, M, C, B).

Each of the developing units 62 develops the electrostatic latent image on the surface of each of the photosensitive members 58 with toner to which the corresponding color is provided.

Each of the transfer units 64 transfers a toner image, which is formed on each of the photosensitive members 58, to a recording medium, which is transferred through the transfer belt 52, in a state that the transfer belt 52 is provided between each of the photosensitive members 58 and each of the transfer units 64 to be opposite to each of the photosensitive members 58.

Each of the cleaners 66 removes the residual toner, which is left on each of the photosensitive members 58 after each toner image is transferred through each of the transfer units 64.

Each of the discharge units 68 removes the residual voltage, which is left on each of the photosensitive members 58 after each toner image is transferred through each of the transfer units 64.

Irradiation of the respective laser beams LY, LM, LC, and LB, which are guided by the respective mirrors 37Y, 37M, 37C, 33B of the laser exposer unit 1, is provided between the respective charge units 60 (Y, M, C, B) and the respective developing units 62 (Y, M, C, B).

A paper cassette 70 is provided under the transfer belt 62 to contain the recording medium for transferring the image formed by each of the image forming units 50 (Y, M, C, B), that is, paper P.

A feeding roller 72 having a semicircular cross section is provided at the position, which is one end portion of the paper cassette 70 and a portion close to the tension roller 54, so as to pick up paper P contained in the paper cassette 70 one by one from the uppermost section.

A resist roller 74 is provided between the feeding roller 72 and the tension roller 54. The resist roller 74 is used to conform the top end of one paper P, which is picked up from the cassette 70, to the top end of each toner image formed on the respective image forming units 50, particularly the toner image formed on the photosensitive member 58B by the image forming unit 50B.

There is provided an absorption roller 74 at a portion between the resist roller 74 and the first image forming unit 50Y, that is, a portion close to the tension roller 54, substantially on an outer periphery of the tension roller 54. The absorption roller 76 provides a predetermined electrostatic absorption. The axis of the absorption roller 76 and the tension roller 54 are arranged to be parallel with each other.

There are provided resist sensors 78 and 80 at a portion, which is one end of the transfer belt 52, and close to the belt drive roller 56, substantially on an outer periphery of the belt drive roller 56 to have a predetermined distance in an axial direction of the belt drive roller 56. The resist sensors 78 and 80 detect the position of the image formed on the transfer belt 52 (FIG. 10 is the front cross sectional view showing only the back sensor 80).

A transfer belt cleaner 82 is provided on the transfer belt 52 corresponding to the outer periphery of the belt drive roller 56. The transfer belt cleaner 82 removes toner adhered onto the transfer belt 52 or paper dust from paper P.

A fixing unit 84 is provided in a direction where paper P transferred through the transfer belt 52 is detached from the tension roller 56 and further transferred. The fixing unit 84 is used to fix the toner image, which is transferred onto the paper P, to paper P.

Figure 3:
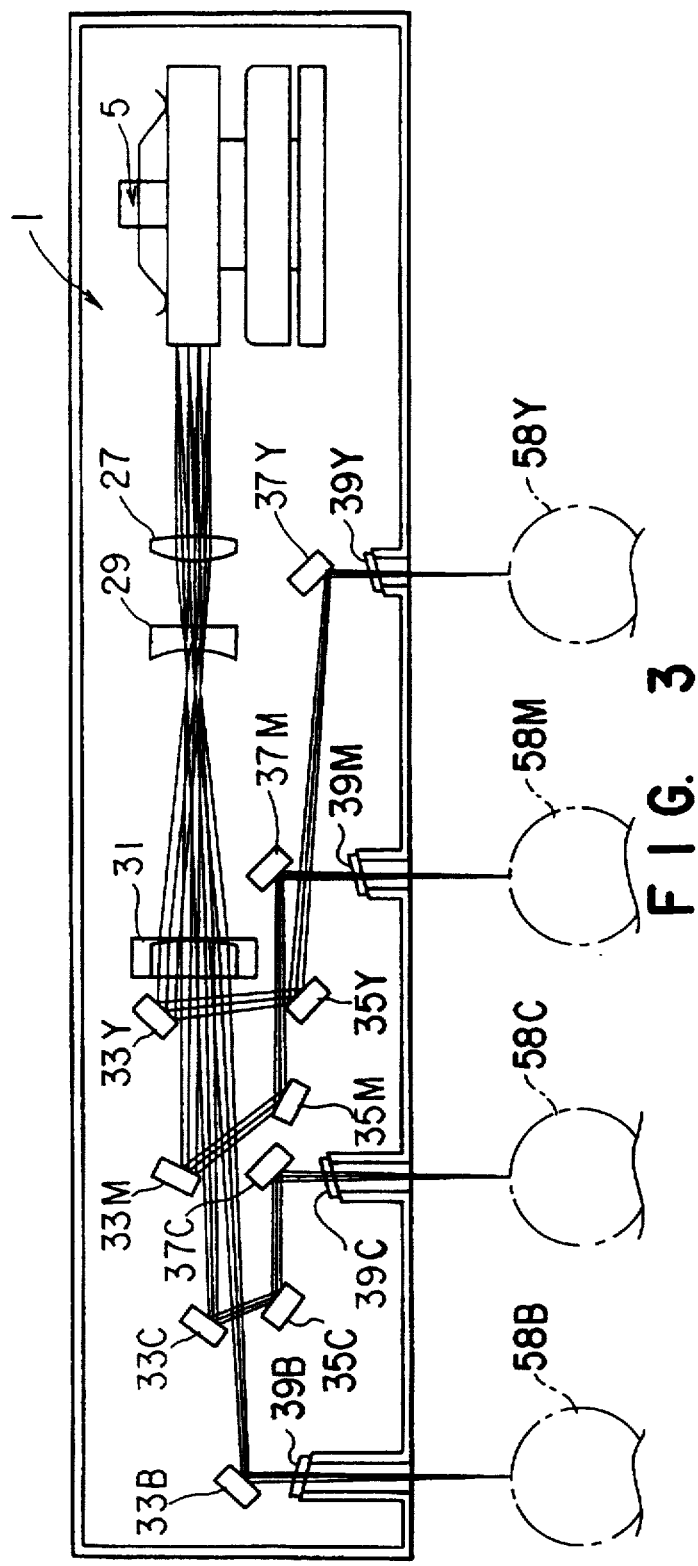
FIG. 3 is a view of an optical path where in a portion of a pre-deflection optical system of the optical laser exposer unit of FIG. 2 is expanded.

FIGS. 2 and 3 are a schematic plain view and a schematic cross sectional view each showing a state in which a housing of the multi-beam laser exposer unit, which is used in the image forming apparatus of FIG. 1, is removed.

According to FIG. 2, the multi-beam laser exposer unit 1 has first to fourth semiconductor lasers (plurality of light sources) 3Y, 3M, 3C, and 3B and a polygonal mirror unit 5 (deflecting means). The first to fourth semiconductor lasers 3 (Y, M, C, and B) generate first to fourth laser beams LY, LM, LC, and LB corresponding to image data, which is color-separated in accordance with color components, respectively. The polygonal mirror unit 5 deflects each of the laser beams LY, YM, LC, and LB emitted from each of the lasers 3Y, 3M, 3C, and 3B toward the image-forming object, which is provided at a photosensitive member to be described later, at a predetermined constant angular speed.

The semiconductor laser 3Y, 3M, 3C, and 3B are arranged in order of 3Y, 3M, 3C, and 3B toward the polygonal mirror unit 5 to have a predetermined angle. The laser 3B corresponding to the B (Black) image is provided such that the laser beam LB, directing from the laser 3B toward the reflecting surface of the polygonal mirror unit 5, can be made incident onto the polygonal mirror unit 5 without being reflected by mirrors to be described later.

As shown in FIG. 2, a plurality of pre-deflection optical systems (first optical means) 7 (Y, M, C, and B) is provided between each of the lasers 3 (Y, M, C, and B) and the polygonal mirror unit 5. The pre-deflection optical systems 7 (Y, M, C, and B) are light source side optical systems, which are used such that the cross section beam spot of each of the laser beams LY, LC, LM, and LB is adjusted to have a predetermined shape.

The polygonal mirror unit 5 includes a polygonal mirror body 5a in which eight-face plane reflectors are arranged in a shape of a regular polygon, and a motor 5m, which rotates the polygonal mirror body 5a in a predetermined direction at a fixed speed. The polygonal mirror body 5a is formed of, for example, an aluminum alloy.

The pre-deflection optical systems 7 (Y, M, C, and B) have finite focal lenses 9 (Y, M, C, and B), hybrid cylinder lenses 11 (Y, M, C, and B), respectively, and only one pre-deflection mirror block 13. Each of the finite focal lenses 9 (Y, M, C, and B) of the first optical means L (Y, M, C, and B), receive laser beams that are emitted from each of the lasers 3 (Y, M, C, and B), in both a main-scanning direction, and a sub-scanning direction. The main-scanning direction is a first direction where the laser beams L (Y, M, C, and B) are deflected by the polygonal mirror unit 5, and the sub-scanning direction is a second direction, which is perpendicular to the first direction. Each of the hybrid cylinder lenses 11 (Y, M, C, and B) of the first optical means provides further convergence to the laser beam passed through the finite focal lenses 9 (Y, M, C, and B) only in the sub-scanning direction. The mirror block 13 of the first optical means is used to bend each of three laser beams passed through the hybrid cylinder lens 11 (Y, M, and C) toward each of the reflecting surfaces of the polygonal mirror unit 5. The laser beams 3 (Y, M, C, and B), the finite focal lenses (Y, M, C, and B), the hybrid cylinder lenses 11 (Y, M, C, and B) and the mirror block 13 are integrally arranged on a support member, which is formed of, for example, an aluminum alloy.

As the finite focal lenses 9 (Y, M, C, and B), there is used an aspherical glass lens or a lens formed by adhering an UV (ultraviolet) light-curing plastic-made aspherical portion to the surface of the spherical glass lens. The respective finite focal lenses 9 (Y, M, C, and B) are fixed onto the support member 15 through one of kinematic mount (not shown), which are formed of material having substantially the same coefficient of thermal expansion as the support member 15, such as a barrel and/or a lens holding ring.

The hybrid cylinder lenses 11 (Y, M, C, and B) include plastic cylinder lenses 17 (Y, M, C, and B) and glass cylinder lenses 19 (Y, M, C, and B), respectively. Substantially the same radius of curvature is provided to the plastic cylinder lenses 17 and the glass cylinder lenses 19 in the sub-scanning direction.

The plastic cylinder lenses 17 (Y, M, C, and B) are formed of material such as RMMA (polymethyl methacrylate) and the glass cylinder lenses 19 (Y, M, C, and B) are formed of, for example, SFS1. The plastic cylinder lenses 17 and the glass cylinder lenses 19 are fixed onto the support member 15 through lens holding member (not shown), which are formed of material having substantially the same coefficient of the thermal expansion as the support member 15. The finite focal lenses 9 (Y, M, C, and B) and the hybrid cylinder lenses 11 (Y, M, C, and B) may be supported by the same lens holding member.

Figure 5:
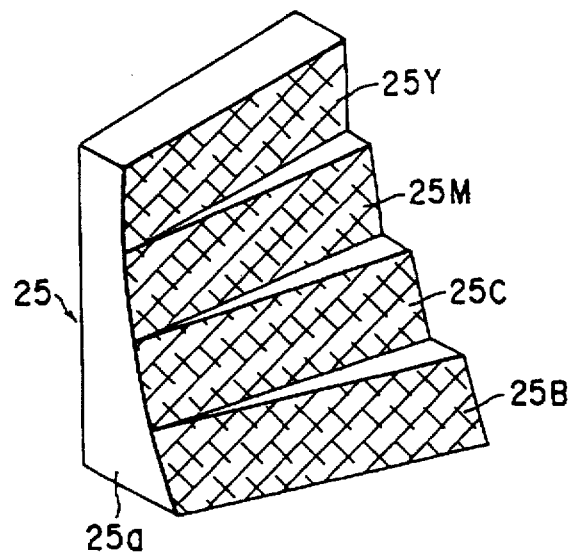
FIG. 5 is a schematic perspective view of a mirror for a horizontal sync detection in the optical laser exposer unit of FIG. 2.

There are provided an image surface side optical system, which is a post-deflection optical system 21 (second optical means), a horizontal sync detector 23, and only one mirror block 25 (third optical means) for a horizontal sync between the polygonal mirror unit 5 and the photosensitive member 25. The post-deflection optical system 21 is used to substantially linearly image-form each of the laser beams L (Y, M, C, and B), which are deflected by the respective reflecting surfaces of the polygonal mirror unit 5, at a predetermined position of the photosensitive member 25. The horizontal sync detector 23 detects a part of the respective laser beams L (Y, M, C, and B), which are passed through the post-deflection optical system 21, so as to define a generation timing of a horizontal sync signal to be described later. The mirror block 25 has a fourth reflective sections described in FIG. 5 is provided between the post-deflection optical system 21 and the horizontal sync detector 23 to reflect a part of the four laser beams L (Y, M, C, and B), which are passed through the post-deflection optical system 21, toward only one horizontal sync detector 23.

The post-deflection optical system 21 includes first to third image-form lenses 27, 29, and 31 so as to provide a predetermined aberration characteristic to four laser beams L (Y, M, C, and B), which are deflected by the respective reflecting surfaces of the polygonal mirror unit 5, in the wide scanning width, that is, the entire length area of the main-scanning direction at the photosensitive member 58 (Y, M, C, B) of the laser beam scanned on the image surface by the polygonal mirror unit 5. Also, the first to third image-form lenses 27, 29, and 31 are used to control the variation of the photosensitive member 58 (Y, M, C, B) of each laser beam.

The first image-form lens 27 is structured such that an incident surface $27_{in}$ and an emission surface $27_{ra}$ are formed on a toric surface.

Then, synthetic power of the incident surface $27_{in}$ and the emission surface $27_{ra}$ in the sub-scanning direction is positive. The direction of the the toric surface of the rotational symmetrical axis of the incident surface $27_{in}$ is defined to the main scanning direction. The direction of the the toric surface of the rotational symmetrical axis of the emission surface $27_{ra}$ is defined to the sub-scanning direction.

The second image-form lens 29 is structured such that an incident surface $29_{in}$ is formed on the rotational symmetrical surface and an emission surface $29_{ra}$ is formed on a toric surface.

Then, synthetic power of the incident surface $29_{in}$ and the emission surface $29_{ra}$ in the sub-scanning direction is negative. The direction of the the toric surface of the rotational symmetrical axis of the emission surface $27_{ra}$ is defined to the main scanning direction.

The third image-form lens 31 is structured such that an incident surface $31_{in}$ is formed on a toric surface and an emission surface $31_{ra}$ is the rotational symmetrical surface.

Then, synthetic power of the incident surface $31_{in}$ and the emission surface $31_{ra}$ in the sub-scanning direction is positive. The direction of the the toric surface of the rotational symmetrical axis of the incident surface $31_{in}$ is defined to the main scanning direction.

The optical characteristics of the first to third image-form lenses 27, 29 and 31 are shown in the following Table 1.

TABLE 1

Lens data of post-deflection optical system

| radius | | | | | direction |
|---|---|---|---|---|---|
| main-scanning | sub-scanning | thickness | coefficient of aspherical surface | material | of toric axis |
| 242.43 | −136.36 | 35.28 | | AIR | |
| 284.74 | 47.87 | 5.00 | d = e = f = g = 0 | PMMA | main-scanning direction |
| 438.41 | — | 10.87 | d = e = f = g = 0 | AIR | sub-scanning direction |
| 376.60 | −149.99 | 7.00 | d = e = f = g = 0 | PMMA | |
| −310.79 | −150.00 | 56.84 | d = e = f = g = 0 | AIR | main-scanning direction |
| −1701.74 | — | 9.95 | d = e = f = g = 0 | PMMA | |
| plane | plane | 30.05 | d = e = f = g = 0 | AIR | |
| plane | plane | 2.00 | | BK7 | |
| plane | plane | 200.00 | | AIR | |

$$z = \frac{cy^2}{1 + \sqrt{1 + c^2(cc+1)y^2}} + dy^4 + ey^6 + fy^8 + gy^{10} \quad (1)$$

In this case, if a coordinate system is a right-hand system, a meridian of each lens in the main-scanning direction is shown as follows:

z=wherein c: curvature on the optical axis in the direction parallel to the direction of the toric axis of the toric lens, cc: coefficient of conic, d, e, f, g: coefficient of aspherical surface.

The surface whose curvature of the sub-scanning is shown by only "−" is a certain type of a lens shape, which is obtained by rotating the meridian to the optical axis. The surface whose curvature is shown by a specific value shows a shape, which is obtained by rotating the meridian at the axis moved in parallel with the direction shown in the item of the toric axis in the plane separated in the direction of axis z of the local coordinates by the amount of 1/curvature.

There are provided first mirrors 33Y, 33M, 33C, and 33B, second mirrors 35Y, 35M, and 35C, and third mirrors 37Y, 37M, and 37C between the third image-form lens of the post-deflection optical system 21, that is, the lens 31, which is placed at a position closest to the photosensitive drum 58, the photosensitive drum 58. The first mirrors 33Y, 33M, 33C, and 33B bend four laser beams LY, LM, LC, and LB, which are passed through the lens 31, to be directed to the photosensitive drum 58. The second mirrors 35Y, 35M, and 35C, and the third mirrors 37Y, 37M, and 37C further bend the laser beams LY, LM, and LC bent by the first mirrors 33Y, 33M, and 33C. In this case, as shown in FIG. 3 (same as FIG. 1), the laser beam LB, which corresponds to B (black image), is reflected by the first mirror 33B to be guided to the photosensitive drum 58 without passing through the other mirrors. In the other words, the number of each of the second and third mirrors is three versus four laser beams.

Figure 14A:
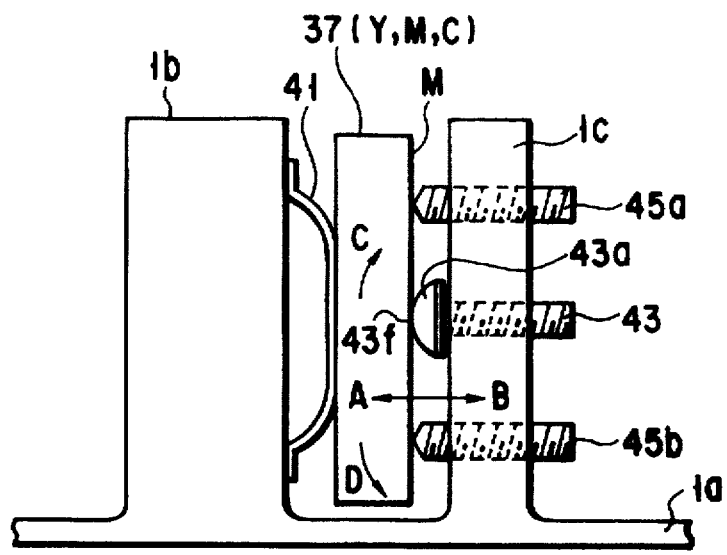
FIGS. 14A and 14B are schematic perspective views each showing an adjusting mechanism of an emission mirror of the optical laser exposer unit of FIGS. 2 and 3.
Figure 14B:
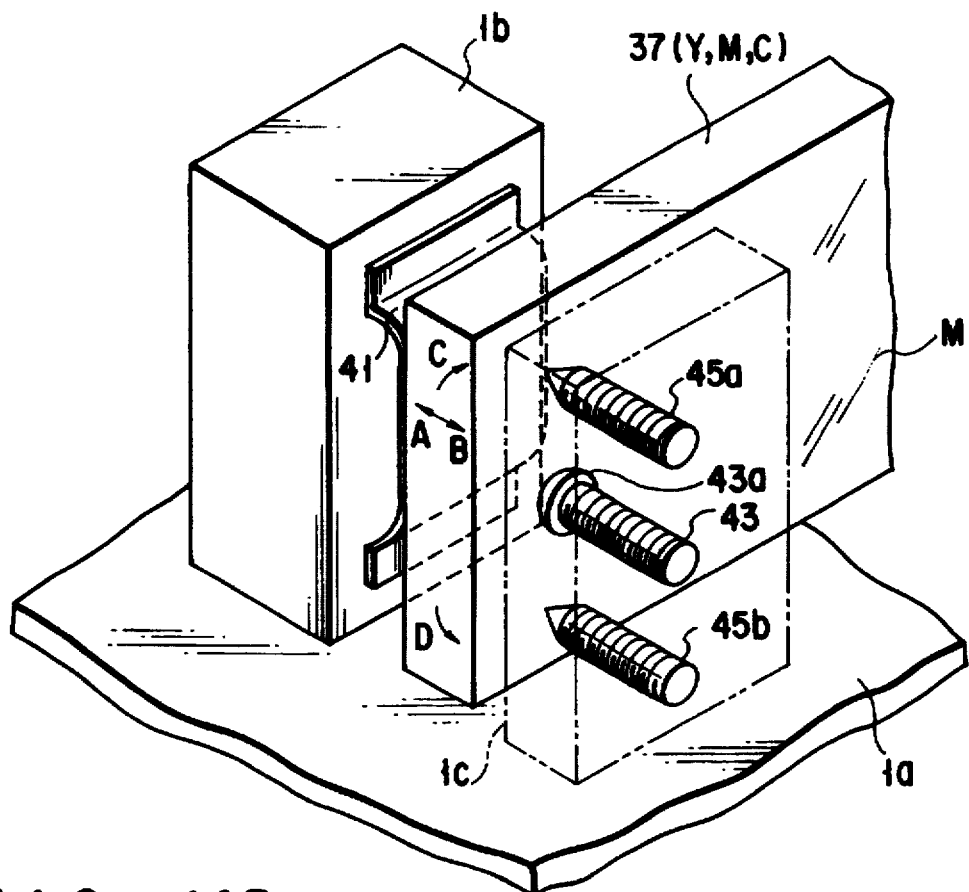

The first, second, and third image-form lenses 27, 29, and 31, and the first mirror 33B are fixed to a plurality of fixing members (not shown), which are formed in an intermediate base 1a of the optical laser exposer unit 1 by an integral mold, with adhesion, respectively. The first mirror 33B is brought into contact with the surface of the mirror, that is, the surface formed by depositing metal, serving as a reflection member, on a support member such as glass. Thereby, the laser beams, which are made incident onto the respective mirrors, can correctly set a length of an optical path. Regarding the other first mirrors 33Y, 33Y, and 33C, and second mirrors 35Y, 35M, 35C, and third mirrors 37Y, 37M, and 37C, as shown in FIGS. 14A and 14B, the side where the reflection material such as aluminum is coated or deposited on the reflected surface such as glass is brought into contact with the fixing member whose angle and position are changeable. Also, the above-mentioned side is pressurized to the fixing member by a predetermined pressure, thereby the position of the reflected surface is fixed not to be varied. Dustproof glasses 39Y, 39M, 39C, and 39B for preventing dust from entering the interior of the optical laser exposer unit 1 are provided at a portion among third mirrors 37Y, 37M, 37C, the first mirror 33B, and the photosensitive drum 58, and a position where the four laser beams L (Y, M, C, B) reflected by the respective mirrors 33B, 37Y, 37M, and 37C are emitted from the optical laser exposer unit 1.

As shown in FIG. 3, the dustproof glasses 39Y, 39M, 39C, and 39B are fixed to the housing 1a so as to cross the chief ray of each of the four laser beams L (Y, M, C, B) reflected by the respective mirrors 33B, 37Y, 37M, and 37C to have a predetermined angle.

The housing 1a includes dustproof glass holding portions that are made from, for example, glass fiber reinforced polycarbonate. The dustproof glasses 39Y, 39M, 39C and 39B are fixed on the dustproof glass plate holding portions of the housing 1a by an Ultra-violet herding adhesive.

Figure 4:
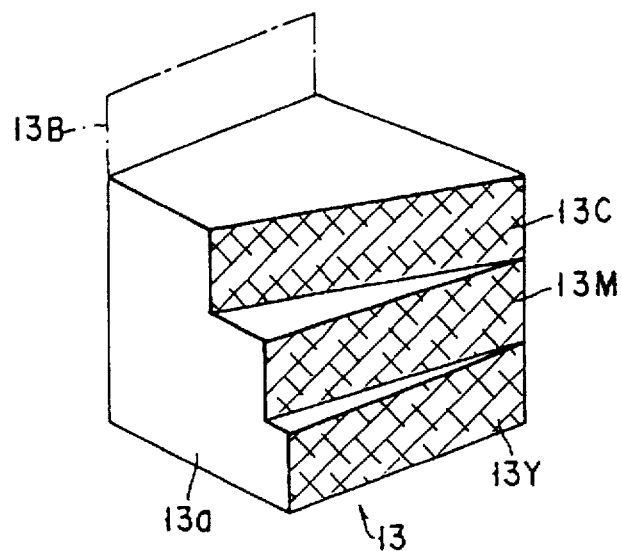
FIG. 4 is a schematic perspective view of a mirror block before deflection in the optical laser exposer unit of FIG. 2.

The respective laser beams LY, LM, LC, and LB are emitted to an external portion of the optical laser exposer unit 1 with a substantially the same interval by the third mirrors 37Y, 37M, and 37C, and the first mirror 33B. In this case, the laser beam LB (black) is emitted to the respective drums 58 from the optical laser exposer unit 1 through the optical path including only one first mirror 33B. The number of the mirrors in each optical path is set to an odd number, one or three. Due to this, the directions of the curves of the main scanning lines (phase of the curve of the main scanning line) of the respective laser beams L (Y, M, and C), which are reached the image surface due to the inclination of the first to third image-form lenses 27, 29, and 31 of the post-deflection optical system, can be set to be the same. Also, as shown in FIG. 4 to be described later, the laser beam LB is passed through a passage area 13B of a mirror block 13. Due to this, the amount of the error, which is included in the optical path, is small as compared with the other laser beams L (Y, M, and C). Therefore, the laser beam LB can be used as a reference in adjusting parallelism of the other laser beams L (Y, M, and C).

The following will specifically explain the optical characteristic of the hybrid cylinder lens 11Y.

Regarding the first to third image-forming lenses 27, 29, and 31 of the post-deflection optical system 21 (second optical means), these lenses are formed of plastic such as PMMA. Due to this, for example, it is known that a refractive index n is varied from 1.4876 to 1.4789 when the peripheral temperature is varied between 0° to 50° C. In this case, the sub-scanning direction image forming position is varied about ±12 mm when the laser beam, which is passed through the first to third image forming lenses 27, 29, and 31, is actually condensed on the photosensitive member 58 (Y, M, C, B).

In order to reduce the above variation, the lenses having the same material as lenses used in the post-deflection optical system 21 (second optical means) are incorporated into the pre-deflection optical system (first optical system) 7 in an optimum curve state. Thereby, the variation of the sub-scanning direction image forming position, which is caused by the change of the refractive index n due to the temperature change, can be reduced to about ±0.5 mm when the laser beam passed through the first to third image forming lenses 27, 29, and 31 is actually condensed on the photosensitive member 58. Due to this, as compared with the conventional optical system in which the pre-deflection optical system 7 is formed of glass lenses and the post-deflection optical system 21 is formed of plastic lenses, it is possible to correct the color aberration of the sub-scanning direction, which is caused by the variation of the refractive index due to the temperature change of the lenses of the post-deflection optical system 21.

As is obvious from FIG. 2 (same as FIG. 1), each of the laser beams LY, LM, LC, and LB is made symmetrically incident onto the optical axis O (optical axis of the system) of the laser exposer unit 1 in the sub-scanning direction. In other words, the laser beams LY and LB are made symmetrically incident onto the polygonal mirror 5a to sandwich the optical axis O. Also, the laser beams LM and LC are made symmetrically incident onto the polygonal mirror 5a to sandwich the optical axis O. Therefore, regarding the respective laser beams, the optimum post-deflection optical system 21 can be obtained at two portions of the sub-scanning direction. Due to this, characteristics such as the field curve and/or astigmatism can be improved. In this case, by the optimum post-deflection optical system 21 may be reduced.

FIG. 4 shows details of a mirror block 13, which is mounted on the laser exposer unit.

The mirror block 13 includes a block body 13a and a plurality of mirror portions 13 (Y, M, C). The block body 13a is formed of material having a low coefficient of thermal expansion such as an aluminum alloy. Each of the mirror portions 13Y, 13M and 13C are arranged on a predetermined surface of the block body 13a. The number of the mirror portions is set to be one less than the number of colors separated in accordance with the color component, which can be image-formed.

According to FIG. 4, the mirror block 13 is used to guide the first to fourth laser beams L (Y, M, C, and B), serving as one flux Lo of the laser beam, to the respective reflecting surfaces of the polygonal mirror unit 5.

More specifically, the mirror block 13 in the first optical means includes first to third reflecting surfaces 13Y, 13M, and 13C, and a passing area 13B. The first reflecting surface 13Y is used to bend the laser beam LY emitted from the laser 3Y to be guided to each of the reflecting surfaces of the polygonal mirror unit 5 (deflecting means). The second and third reflecting surfaces 13M and 13C are used to bend the laser beam 3C toward each of the reflecting surfaces of the polygonal mirror unit 5. The passing area 13B is used to directly guide the laser beam LB from the laser 3B to each of the reflecting surfaces of the polygonal mirror unit 5.

Each of these reflecting surfaces 13Y, 13M, and 13C is cut at a predetermined angle to the laser beam LB directly moving through the block body 13a. Thereafter, the cut surface is coated with material having high reflectance such aluminum or such a material is deposited thereon. The cut surfaces may be polished.

According to the mirror block of FIG. 4, since the reflecting surfaces 13Y, 13M, and 13C are cut from one block body 13a, the relative inclination error of each mirror is reduced. As a method for manufacturing the block body 13a, a die-cast method can be used. Therefore, there can be obtained a mirror block having high precision.

As already explained above, the laser beam LB from the laser 3B is passed through the passing area 13B on the block body 13a without crossing the mirror block 13 to be directly guided to each of the reflecting surfaces of the polygonal mirror unit 5.

The following will explain intensity (amount of light) of each laser beam, which is reflected on the mirror block 13 and guided to each of the reflecting surfaces of the polygonal mirror unit 5.

As a method for making two or more laser beams incident onto the reflecting surfaces of the polygonal mirror unit 5 as one flux of the laser beam as stated in prior art, Japanese Patent Application KOKAI Publication No. 5-34612 already proposes a method in which the laser beams are sequentially overlaid on each other by the plate beam splitter. However, it is well known that 50% of the amount of the laser beam emitted from the laser is made useless for every reflection and transmission (every time when the laser beam is passed therethrough) due to the use of the plate beam splitter. In this case, even if transmissivity of the plate beam splitter and reflectance thereof are made suitable in accordance with each laser beam, light intensity (amount of light) of any one of the laser beams to be passed through the plate beam splitter is reduced to about 25%. Moreover, it is well known that that there is generated a difference between the respective laser beams in terms of the field curve and astigmatism. The generation of such a difference is caused by the following points.

More specifically, the plate beam splitter is inclined in the optical path. Also, the number of the plate beam splitters where the beam is passed through is different. On the other hand, since the field curve and astigmatism of the respective laser beams are different, it is difficult for all laser beams to be image-formed by the same finite focal lens and the cylinder lens.

In contrast, according to the mirror block 13 shown in FIG. 4, the laser beams LY, LM, and LC are bent by the normal mirror at a position placed before the polygonal mirror 5a of the polygonal mirror unit 5 and an area where the respective laser beams are mutually separated in the sub-scanning direction. Therefore, the amount of light of each laser beam, which is be supplied to the photosensitive member 58 by the polygonal mirror 5a, can be maintained to be about 90% or more of the amount of emitted light from the finite focal lens 9. Whereby, the output of each laser can be reduced, and the aberration of light to be reduced at the photosensitive member 58 can be corrected to be equal, thereby making it possible to reduce the beam spot and lead to high precision. The laser 3B corresponding to B (black) is passed through the passing area 13B of the mirror block 13 to be guided to the polygonal mirror 5a. Due to this, the output capacity of the laser can be reduced, and the error of the incident angle onto the polygonal mirror 5a, which is caused by the reflection from the reflecting surface, can be removed.

FIG. 5 shows only one mirror, which can guide the respective laser beams to the photosensitive drum 58, to the horizontal sync detectors.

In FIG. 5, the mirror block 25 (third optical means) has first to fourth mirror surfaces 25Y, 25M, 25C, and 25B, and a mirror block 25a for holding the mirror surfaces 25Y, 25M, 25C, and 25B as one unit. The first to fourth mirror surfaces 25Y, 25M, 25C, and 25B are formed at a different angle to both the main-scanning direction and the sub-scanning direction in order to reflect the respective laser beams L (Y, M, C, and B) in the main-scanning direction at a different timing against the detector 23, and to provide substantially the same level (height) on the detector 23 in the sub-scanning direction.

The mirror block 25a is formed of, for example, glass fiber reinforced polycarbonate. The respective mirror mirror surfaces 25Y, 25M, 25C, and 25B of the mirror block 25a are formed to be as one unit at a predetermined angle. Alternatively metallic material such as aluminum is deposited on portions cut from the mirror block 25a. The mirror surfaces are shaped to be removed from the mold without providing an under-cut at the portions corresponding to the mirror surfaces.

As mentioned above, the respective laser beams LY, LM, LC and LB, which are deflected by the polygonal mirror unit 5, can be made incident onto one detector 23. In addition, there can be solved the problem of sensitivity of each detector and the shift of the horizontal sync signal, which are caused in the unit having the plurality of detectors. It is needless to say that the laser beams are made incident onto the detector 23 four times per one line of the main-scanning direction by use of the mirror block 25.

Back to FIG. 3 (and FIG. 1), the following will explain the relationship among the inclination of each of the laser beams L (Y, M, C, B), the mirror 33B (first optical element), and the mirrors 37 (Y,M,C) (second optical element).

As explained above, the laser beams L (Y, M, C, B) to which the predetermined aberration characteristics are provided through the first to third toric lenses 27, 29, and 31 after being reflected by the polygonal mirror 5a, are separated and/or bent in the predetermined direction through the first mirrors 33 (Y, M, C, B).

The laser beam LB corresponding to B (black image) is reflected by the first mirror 33B, and passed through the dustproof glass 39B to be guided to the photosensitive member 58. The other laser beams L (Y, M, and C) are guided to the second mirrors 35 (Y, M, and C), respectively, and reflected toward the third mirrors 37 (Y, M, and C) by the second mirrors 35 (Y, M, and C). The respective laser beams L (Y, M, C), which are reflected by the third mirrors 37 (Y, M, C), are image-formed on the photosensitive member 58 with substantially an equal interval through the dustproof glasses 39 (Y, M, C). In this case, the laser beam LB from the mirror 33B and the laser beam LC adjacent to the laser beam LB are also image-formed on the photosensitive member 58 with substantially an equal interval.

Figure 6:
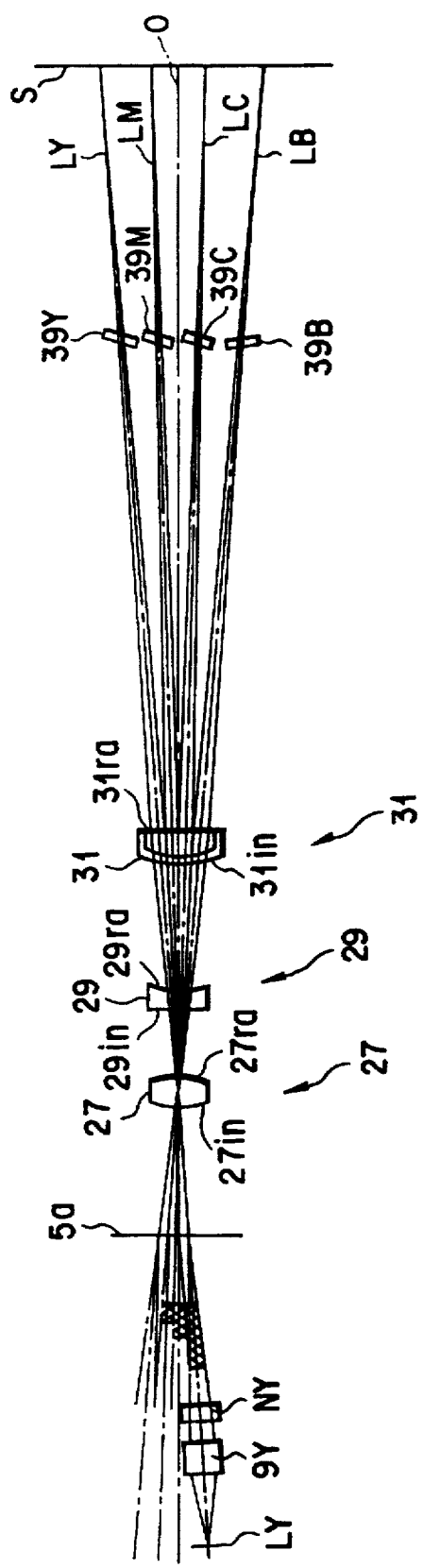
FIG. 6 is a schematic cross sectional view showing a position of a laser beam of each lens of the optical laser exposer unit of FIGS. 2 and 3.
Figure 7:
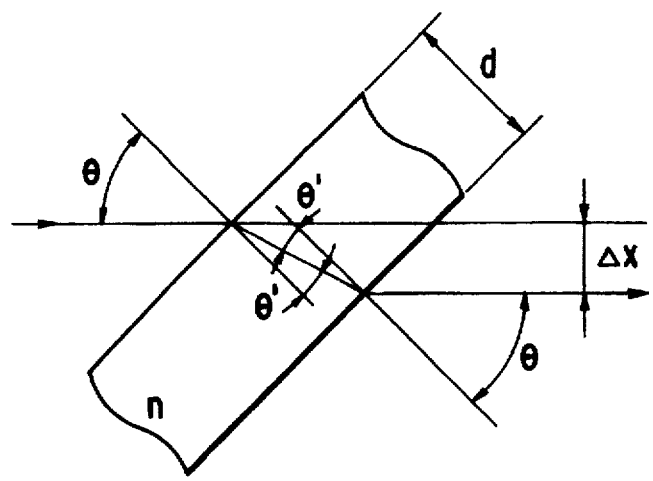
FIG. 7 is a schematic cross sectional view showing an inclination of a parallel plate glass member of the optical laser exposer unit of FIGS. 2 and 3 in a sub-scanning direction, and a position of the laser beam, which is passed through the parallel plate glass member, in the sub-scanning direction.
Figure 8:
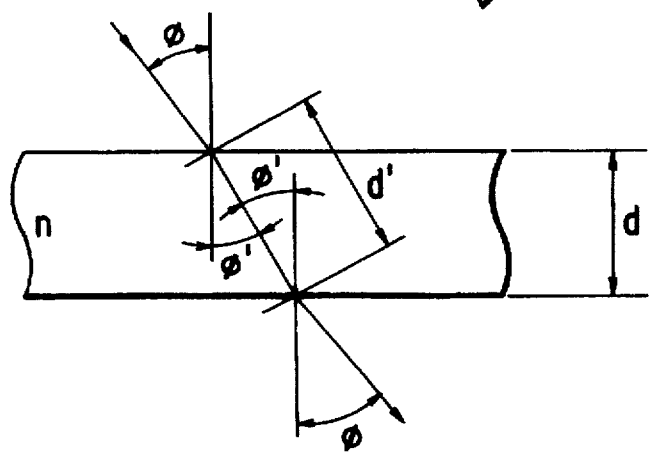
FIG. 8 is a schematic cross sectional view showing an inclination of the parallel plate glass member of FIG. 7 in the sub-scanning direction, and a distance of the laser beam, which is passed through the parallel plate glass member, in the main-scanning direction.

As shown in FIGS. 3 and 6, the dustproof glasses 39Y, 39M, 39C and 39B are arranged to have a predetermined angle against the chief ray of each of the four laser beams L (Y, M, C, B) reflected by the respective mirrors 33B, 37Y, 37M, and 37C. Due to this, the respective laser beams L (Y, M, C, B) are passed through the dustproof glasses 39 (Y, M, C, B) so as to be guided to the light beam emission position, which is different from the extended line of the light beam incident position when the light beams are incident onto the dustproof glasses 39. As a result, the shift between each of the light beam incident position and each of the light beam emission position becomes minimum at the position where the deflection angle of the mirror 5a is 0°. Then, as the deflection angle is increased, the shift therebetween is gradually increased. Then, an angle formed between each of the laser beams L (Y, M, C, B) and each of the dustproof glasses 39 (Y, M, C, B) is suitably set as shown in FIGS. 7 and 8 to be described later. Thereby, the deviation of the curve of the main scanning line, which is provided to the respective laser beams L (Y, M, C, B) when passing through the first to third image-form lenses 27, 29, and 31, can be corrected. Therefore, the color shift, which is caused when four laser beams are superimposed on each other, is reduced.

FIGS. 7 and 8 are views of optical paths each showing the relationship between the angle formed between each of the laser beams L (Y, M, C, B) and each of the dustproof glasses 39 (Y, M, C, B) and the curve of the main scanning line of each of the laser beams L (Y, M, C, B).

FIG. 7 is a cross sectional view showing the dustproof glass 39 (one of dustproof glasses will be typically explained here), that is, the parallel plate, which is inclined at only an angle θ to the optical path of the laser beam, seen from the sub-scanning direction. In this case, no parallel plate exists between the mirror and the photosensitive drum, that is, a line connecting the reflection point of the mirror of the laser beam, which directs to the photosensitive drum from the mirror provided in the previous stage, to the image-formed position on the photosensitive drum.

As shown in FIG. 7, if the thickness of the parallel plate (dustproof glass 39) is d, and a refractive index of the parallel plate is n, an incident angle of the laser beam to be input to the parallel plate can be shown by θ. Due to this, a refractive angle θ' at the incident surface of the laser beam can be expressed based on Snell's law as follows.

$$\theta' = \sin^{-1}(\sin \theta / n) \qquad (2)$$

Also, the laser beam is emitted from the parallel plate at the refractive angle θ. In other words, the laser beam, which is made incident onto the parallel plate, is passed through the parallel plate to be emitted in parallel with the incident laser beam.

If the distance between the incident laser and the emission laser beam is Δx, the following equation is established.

$$\Delta x = d (\tan \theta - \tan \theta') \cos \theta \qquad (3)$$

FIG. 8 is a cross sectional view showing the dustproof glass 39 (that is, the parallel plate), which is inclined at only an angle φ to the optical path of the laser beam, seen from the main scanning direction. In this case, no parallel plate exists between the mirror and the photosensitive drum, that is, a line connecting the reflection point of the mirror of the laser beam, which directs to the photosensitive drum from the mirror provided in the previous stage, to the image-formed position on the photosensitive drum. The angle φ is equivalent to an amount of the inclination of the parallel plate to the laser beam. In other words, the angle φ is an amount of deflection of the laser beam, which is deflected by the polygon mirror 5a of the deflector 5. Or, the angle φ is an angle of the laser beam to the line connecting the reflection point of the mirror 5a to the photosensitive drum. Or, the angle φ shows a direction, which is seen from the direction perpendicular to each of the main scanning direction and the sub-scanning direction.

As shown in FIG. 8, if the thickness of the parallel plate (dustproof glass 39) is d, and a refractive index of the parallel plate is n, an incident angle of the laser beam to be input to the parallel plate can be shown by φ. Due to this, a refractive angle φ' at the incident surface of the laser beam can be expressed based on Snell's law as follows.

$$\phi' = \sin^{-1}(\sin \phi / n) \quad (4)$$

Also, the laser beam is emitted from the parallel plate at the refractive angle φ. In other words, the laser beam, which is made incident onto the parallel plate, is passed through the parallel plate to be emitted in parallel with the incident laser beam.

At this time, a distance d' where the laser beam, which is made incident onto the parallel plate at the angle φ, advances the parallel plate can be expressed by the following equation.

$$d' = d / \cos \phi' \quad (5)$$

wherein d'>d.

Then, if d of FIG. 7 is replaced with d' and equations (2) and to (5) are rearranged, the following equation can be introduced.

$$\Delta x = d \left[ (\tan \theta - \tan \{\sin^{-1}(\sin \theta / n)\}) \cos \theta / \cos [\sin^{-1} (\sin \phi / n)] \right] \quad (6)$$

Figure 9:
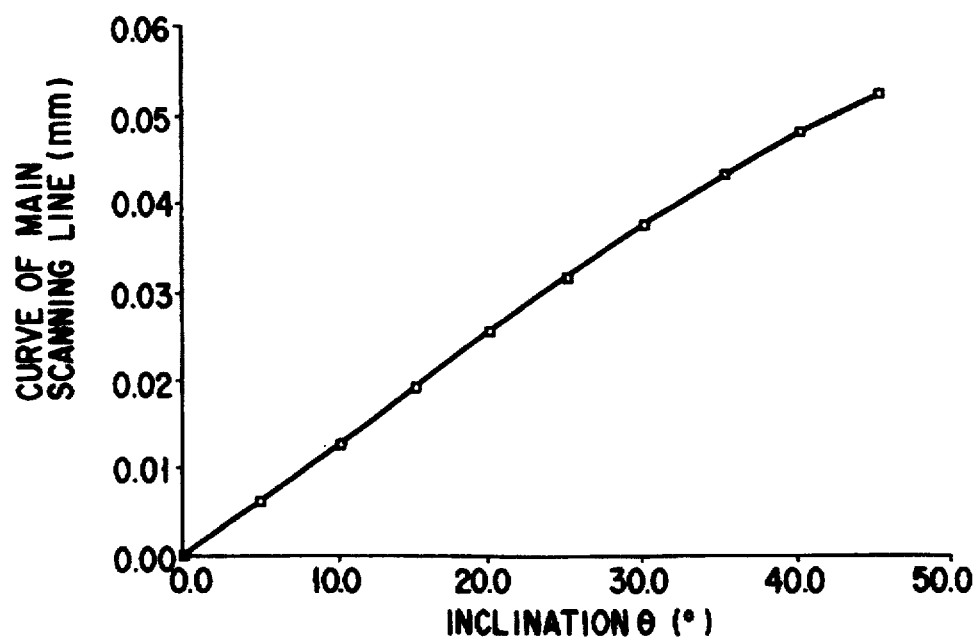

FIG. 9 is a graph showing the relationship between the distance Δx of FIG. 6 and the inclination angle θ of the sub-scanning direction of the parallel plate. In FIG. 9, the maximum value of the angle φ is 25°, the refractive index n=1.47 (material of glass is BK 7), and the thickness d of the parallel plate is 2 mm.

As shown in FIG. 9, it is recognized that the parallel plate is inclined in the sub-scanning direction, thereby the parallel distance Δx between the incident laser beam and the emission laser beam is increased to be substantially proportional to the angle θ. In other words, the amount of the inclination of the parallel plate to the sub-scanning direction and the direction of the inclination of the parallel plate to the incident light are optimized, thereby making it possible to cancel the curve of the main scanning direction, which is provided to each of the laser beams by the first to the third image-form lenses 27, 29, and 31.

FIG. 10 is a graph showing a state that the amount of the curve of each of the laser beams LY, LM, LC, and LB in the main scanning direction is changed in a case where the parallel plate, that is, each of the dustproof glasses 39 (L, M, C, B) is inclined at an angle of ±15° in the sub-scanning direction with respect to each of the laser beams L (Y, M, C, B).

As shown in FIG. 10, it is recognized that the inclination angle θ where the curve of each of the laser beams L (Y,M,C,B) in the main scanning direction becomes minimum with respect to each of the laser beams L (Y, M, C, B). In this case, the laser beam LY and the laser beam LB are symmetrical to the optical axis O with respect to the sub-scanning direction, the laser beam LY is typically shown. Moreover, the polarity (direction) of the laser beam LY and that of the laser beam LB are opposite to each other. Due to this, in the optical laser exposer unit 1, the direction where the dustproof glass 39Y is inclined is opposite to the direction where the dustproof 39B is inclined. However, in this embodiment, the curves of the scanning lines can be improved to the extent that their polarities can be substantially ignored.

FIG. 11 is a graph showing a suitable inclination angle θ obtained when the parallel plate, that is, each of the dustproof glasses 39 (L, M, C, B) is inclined at an angle of ±3° in the sub-scanning direction with respect to each of the laser beams L (Y, M, C, B). Since FIG. 11 is substantially the same as the graph of FIG. 10, which is expanded, the specific explanation will be omitted.

As shown in FIGS. 10 and 11, the amount of the main scanning direction of each of the respective laser beams LY, YM, LC, and LB is obtained, and each of the dustproof glasses is inclined to the optical path of the laser beam at only a predetermined amount in the case where no parallel plate exists between the mirror and the photosensitive drum. Thereby, the curve of each of the laser beams LY, LM, LC, and LB in the main scanning direction can be minimized.

FIG. 12 shows the relationship between the curve of the laser beam and the refractive index of the parallel plate, which is suitable for the dustproof glass. As shown in FIG. 12, the amount of correction of the curve of the laser beam obtained by use of FIGS. 9 to 11 is gradually increased in accordance with increase of refractive index of the parallel plate. However, the increase of the amount shows an non-linear increase. The increase of the amount reaches a peak at a certain refractive index, and sequentially decreases. If refractive index n at which the amount of correction reaches the peak is obtained from the equation (6), about 1.7 of refractive index can be obtained. The parallel plate whose refractive index n exceeds 1.7 is relatively expensive. Due to this, from the result shown in FIG. 12, a parallel plate, which satisfies n≦1.7, may be preferably used.

FIG. 13 is a graph showing the relationship between the inclination angle θ of the parallel plate and the curve of each of the laser beams L in the scanning line in the correction effect, which is useful to obtain the suitable inclined angle of the parallel plate (39).

In view of the point that the optical system of the optical laser exposer unit, if the pitch between the respective dots for forming an image is D, it is known that the curve of each of the laser beams in the scanning line can be improved to the extent that the curve cannot be discriminated in a case where the amount of the curve is within D/4. For example, in the case of the optical laser exposer unit having 600 DPI (dots per 1 inch), an allowable amount of the curve of each of the laser beams is about 10.6 μm.

Therefore, in the optical laser exposer unit having 600 DPI, as shown in FIG. 13, the parallel plate (39) is inclined at an angle of |0.3| deg or more such that the curve of each of the laser beams is less than 10 μm. In other words, each of the laser beam is made incident onto a normal line of the parallel plate (39) at an angle of 0.3 deg or more or −0.3 deg or less. Thereby, the curve of each of the laser beams in the main scanning line can be effectively corrected.

On the other hand, by inclining the parallel plate, the length of the optical path of each of the laser beams advancing the parallel plate is substantially increased, so that transmittance is decreased by the loss of the parallel plate itself, such as an internal absorption and scattering.

If the incident angle of each of the laser beams to be incident into the parallel plate (39) is θ and the emission angle of each of the laser beams emitting from the parallel plate is θt, transmittance rp of the parallel plate can be expressed as follows.

$$rp = \tan(\theta - \theta t) / \tan(\theta + \theta t) \quad (7)$$

Then, if the refractive index of the parallel plate is n, the emission angle θt can be expressed based on Snell's law as follows.

$$\theta t = \sin^{-1}(\sin \theta / n) \quad (8)$$

The equation (7) can be transformed based on the equation (8) as follows.

$$rp=\tan\{\theta-\sin^{-1}{}^{01\,(sin\,\theta/n)}\}/\tan\{\theta+\sin^{-1}(\sin\theta/n)\} \quad (9)$$

In this case, transmittance of the laser beam passing through the glass forming the parallel plate is about 90%. In the parallel plate, it is needed that the lowest limit of transmittance is about 80%. Due to this, an allowable amount of loss of transmittance is up to 10%.

Therefore, the incident angle θ of the laser beam where 10% of transmittance is lost can be calculated as follows.

$$\tan\{\theta-\sin^{-1}(\sin\theta/n)\}/\tan\{\theta+\sin^{-1}(\sin\theta/n)\}=0.1 \quad (10)$$

If the incident angle θ satisfying the equation (10) is set to Θ, 80% or more of transmittance of the laser beam passing through the parallel plate can be ensured.

Therefore, the dustproof glass 39 (that is, parallel plate) is inclined at an angle of 0.3 deg or more at which the curve of each of the laser beams in the main scanning direction is considerably restrained. Also, the dustproof glass 39 is inclined within the range of Θ deg or less wherein transmittance of the laser beam passing through the parallel plate can be 80% or more. Thereafter, the dustproof glass 39 is fixed to the housing.

In other words, the dustproof glass 39 is fixed to the housing at the inclination angle within the following inequality.

$$0.3\leq\theta\leq\Theta(deg) \quad (11)$$

Thereby, the curve of each of the laser beams is effectively corrected and the lowest limit of transmittance of the laser beam passing through the parallel plate can be ensured.

As mentioned above, the dustproof glass (that is, parallel plate) is inclined within the range satisfying the inequality (11), and the the dustproof glass is fixed to the housing of the optical laser exposer unit. Thereby, dust can be prevented from entering the optical laser exposer unit, and the curve of each of the laser beams emitted from the optical laser exposer unit in the main scanning direction can be reduced to extent that the curve cannot be visually discriminated.

Table 2 shows the inclination angle θ of each of the dustproof glasses 39Y, 39M, 39C, and 39B.

TABLE 2

|  | CURVE OF MAIN SCANNING LINE [mm] | INCINATION θ [°] |
| --- | --- | --- |
| LY (YELLOW) | 0.0006 | −0.8 |
| LM (MAGENTA) | 0.0003 | 1.2 |
| LC (CYAN) | 0.0005 | 2.3 |
| LB (BLACK) | 0.0006 | 0.8 |

FIGS. 14A and 14B are a side view and a schematic perspective view each showing one example of a mirror support mechanism. The mirror support mechanism supports all mirrors at the position, which satisfies a predetermined angle and a predetermined length of the optical path. In this case, all mirrors include the third mirrors 37Y, 37M, and 37C, the second mirrors 35Y, 35M, and 35C, and the first mirrors 33Y, 33M, and 33C, excepting the mirror 33B, which is used as a reference for adjusting the shift of the distance in the sub-scanning direction and the inclination in the main scanning direction. In other words, these mirrors can adjust the optical length, the shift of the distance in the sub-scanning direction, and the inclination in the main scanning direction. In this case, one mirror will be typically described in the following explanation.

As shown in FIGS. 14A and 14B, the mirror is provided at a predetermined position of an intermediate base housing 1a of the optical laser exposer unit 1 and is supported by a fixing member 1b, which is formed as one unit together with the intermediate base 1a, a mirror supporting member 1c, which is opposite to the fixing member 1b to sandwich the corresponding mirror therebetween, and a spring 41. The number of each of the fixing member 1b, the mirror supporting member 1c, and the spring 41 is two. The fixing members 1b, the mirror supporting members 1c, and the springs 41 are formed to be paired with each other against both ends (main scanning direction) of the corresponding mirror, respectively.

A stop screw 43 having a projection 43 of a predetermined size is formed at substantially the center of the height direction of each of the mirror supporting member 1c. The stop screw 43 is movable in the mirror supporting member 1c in directions of arrows A and B by turning the stop screw 43. The projection 43 is formed at the side opposite to the mirror surface of the mirror. Moreover, the projection 43 is one point, which functions as a fulcrum 43f for the rotation of the mirror in the directions of arrows C and D, and which comes in contact with the mirror surface M, that is, the surface where a metal, serving as a reflection member, is deposited on the supporting member such as glass. Whereby, the laser beam, which is made incident onto each mirror, can correctly set the length of the optical path in a state that the position managed by the fulcrum 43f (projection 43a) is used as a reflection position without being influenced by the thickness of the supporting member of the mirror, the refraction and the internal reflection due to the supporting mirror.

A pair of inclination adjusting screws 45a and 45b is provided at the side portions of the stop screw 43 of each mirror supporting member 1c, that is, upper and lower portions of the height direction. The inclination adjusting screws 45a and 45b are movable in the mirror supporting member 1c in the directions of arrows A and B by the turning of the adjusting screws 45a and 45b. Thereby, the mirror can be moved in the directions of arrows A and B.

As shown in FIGS. 14A and 14B, the stop screw 43, and the inclination adjusting screws 45a and 45b are moved in either the direction of arrow A or the direction of arrow B, thereby one end portion of the corresponding mirror is moved in parallel along the intermediate base 1a of the housing of the optical laser exposer unit 1. Also, the contact 43f between the projection 43a of the stop screw 43 and the mirror is used as a fulcrum, and the inclination adjusting screws 45a and 45b are moved to be opposite to each other. Thereby, the mirror is rotated in accordance with the amount of the movement of the inclination adjusting screws 45a and 45b.

At least three of the mirrors 33Y, 33M, 33C, 35Y, 35M, 35C, 37Y, 37M, and 37C are moved or rotated in parallel by the inclination adjusting mechanism and the parallel moving mechanism as shown in FIGS. 14A and 14B. Thereby, the length of the optical path between the reflected surface of the deflector 5 and each of the photosensitive drums 58 (Y, M, C, and B) can be optimized. Also, the shift of the distance in the sub-scanning direction and the inclination in the main scanning direction can be minimized. The specific method will be explained as follows.

Tables 3 to 5 show the result of the change of the amount of de-focus on the curve surface, the change of the shift of the distance in the sub-scanning direction, and the change of the inclination in the main scanning direction which are measured based on the simulation in the following cases.

More specifically, regarding the respective mirrors 33Y, 33M, 33C, 35Y, 35M, 35C, 37Y, 37M, and 37C, the above measurement is executed in a case where the respective mirrors are independently rotated in the sub-scanning direction, that is, the incident angle of the laser beam, which directs to the photosensitive drum from the reflected surface of the deflector, to the mirror, and the emission angle of the laser beam from the mirror are changed. Also, the above measurement is executed in a case where the front side of each mirror and the inner side (which shows the direction perpendicular to the paper surface of FIG. 13 and the back portion of the paper surface) in the main scanning direction are independently moved in parallel. The number of the laser beams used in the simulation is two beams, which are placed on both end portions where the deflection angle (scan angle) of the laser beam becomes maximum. The amount of movement of each mirror is set to 0.2 mm on basis of the reflected surface.

the main scanning direction as a target value, are obtained by an attenuation least square method in the following case.

More specifically, the above result can be obtained in a case where the total number of mirrors for providing the above-mentioned rotation and the parallel movement is two, and the number of times for providing the rotation and the parallel movement (total number of adjusting positions) is four. The examples of Table 3 shows the cases of the respective first mirror 33Y, second mirror 35Y, and third mirror 37Y. Since the cases of the other mirrors corresponding to the residual colors have also the same degree of freedom as the above cases, substantially the same result can be obtained. The damped least square method is one of the methods used in automatic design of lens, which is shown, for example, on pages 131 to 137 of "Lens Design" published by Kyoritz Shuppan Kabushiki Kaisha.

TABLE 3

| first mirror (33) | | | second mirror (35) | | | third mirror (37) | | | |
|---|---|---|---|---|---|---|---|---|---|
| rotation | front | inner portion | rotation | front | inner portion | rotation | front | inner portion | result |
| X | X | X | X | | | | | | |
| X | X | X | | X | | | | | |
| X | X | | X | X | | | | | |
| X | | X | X | X | | | | | |
| | X | X | X | X | | | | | good |
| X | X | X | | | X | | | | |
| X | X | | X | | X | | | | |
| X | | X | X | | X | | | | |
| | X | X | X | | X | | | | |
| X | X | | | X | X | | | | |
| X | | X | | X | X | | | | |
| | X | X | | X | X | | | | |
| X | | | X | X | X | | | | |
| | X | | X | X | X | | | | |
| | | X | X | X | X | | | | |
| X | X | X | | | | X | | | |
| X | X | X | | | | | X | | |
| X | X | | | | | X | X | | |
| X | | X | | | | X | X | | |
| | X | X | | | | X | X | | |
| X | X | X | | | | | | X | good |
| X | X | | | | | X | | X | |
| X | | X | | | | X | | X | |
| | X | X | | | | X | | X | good |
| X | X | | | | | | X | X | |
| X | | X | | | | | X | X | |
| | X | X | | | | | X | X | |
| X | | | | | | X | X | X | |
| | X | | | | | X | X | X | |
| | | X | | | | X | X | X | good |
| | | | X | X | X | X | | | |
| | | | X | X | X | | X | | |
| | | | X | X | | X | X | | |
| | | | X | X | | X | X | | |
| | | | X | X | X | | | X | |
| | | | X | X | | X | | X | |
| | | | X | | X | X | | X | |
| | | | | X | X | X | | X | |
| | | | X | X | | | X | X | |
| | | | X | | X | | X | X | good |
| | | | | X | X | | X | X | |
| | | | X | | | X | X | X | |
| | | | | X | | X | X | X | |
| | | | | | X | X | X | X | good |

Table 3 is the result showing that the position, which is possible to use the change of the amount of de-focus on the curve surface, the change of the shift of the distance in the sub-scanning direction, and the change of the inclination in In a case where the total number of mirrors for providing the above-mentioned rotation and the parallel movement is two, and the total number of adjusting positions is four, it is recognized that the position, which is possible to use the change of the amount of de-focus on the curve surface, the change of the shift of the distance in the sub-scanning direction, and the change of the inclination in the main scanning direction as a target value, can be provided under the following six conditions (a) to (f).

(a) The front side and the inner side of the first mirror and the front side of the second mirror are moved in parallel, and the second mirror is rotated;

(b) The first mirror is rotated, and the front side and the inner side of the first mirror, and the inner side of the third mirror are moved in parallel;

(c) The front side and the inner side of the first mirror and the inner side of the third mirror are moved in parallel, and the third mirror is rotated;

(d) The third mirror is rotated, and the inner side of the first mirror and the front side and the inner side of the third mirror are moved in parallel;

(e) The second mirror is rotated, and the inner side of the second mirror and the front side and the inner side of the third mirror are moved in parallel; and (f) The third mirror is rotated, and the inner side of the second mirror the front side and the inner side of the third mirror are moved in parallel.

Table 4 is the result showing that the position, which is possible to use the change of the amount of de-focus on the curve surface, the change of the shift of the distance in the sub-scanning direction, and the change of the inclination in the main scanning direction as a target value, are obtained by an attenuation least square method in the following case.

More specifically, the above result can be obtained in a case where the total number of mirrors for providing the above-mentioned rotation and the parallel movement is three, and the number of times for providing the rotation and the parallel movement (total number of adjusting positions) is three.

As shown in Table 4, in the case where the total number of adjusting positions is three, it is recognized that there is no position, which is possible to use the change of the amount of de-focus on the curve surface, the change of the shift of the distance in the sub-scanning direction, and the change of the inclination in the main scanning direction as a target value.

Figure 15:
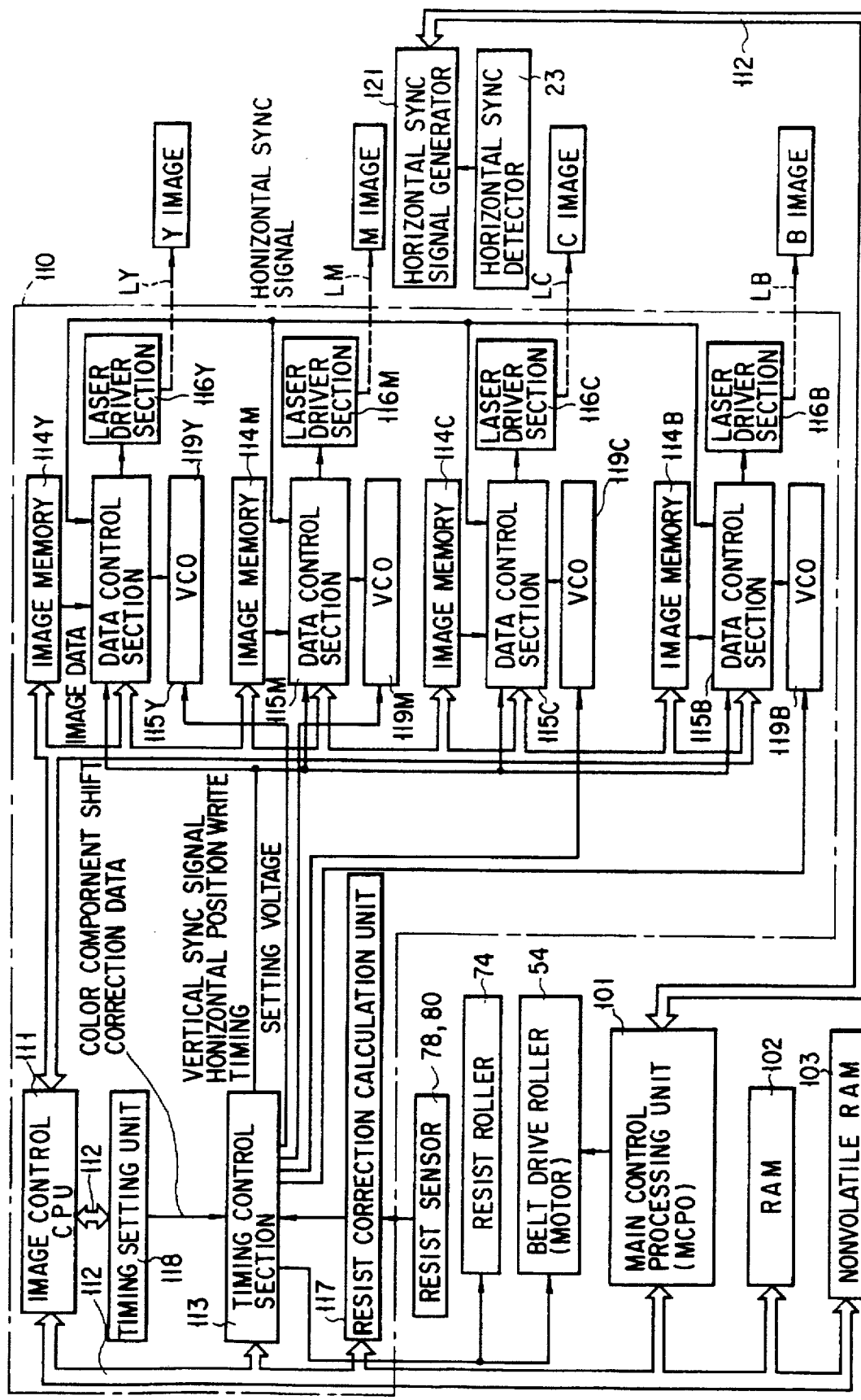
FIG. 15 is a schematic block diagram showing a control section of the image forming apparatus of FIG. 1.

FIG. 15 is a schematic block diagram of an image controlling section for controlling an image forming operation of the image forming unit of FIG. 1.

An image forming unit 100 includes an image control section 110.

The image forming section 110 has a plurality of control units such as an image control CPU 111, a timing control section 113, data control sections 115Y, 115M, 115C, and 115B corresponding to the respective color separated components.

The image control CPU 111, the timing control section 113, and data control sections 115 are mutually connected to each other through a bus line 112.

A main control unit 101 is connected to the image control CPU 111. The main control unit 101 controls an operation of the mechanical elements of the image forming unit 100 such as a motor or a roller through the bus line 112. Also, the main control unit 101 controls a voltage value or an amount of current to be applied to the electrical elements such as the charge units 60, the develop units 62, or the transfer units 64.

A ROM (read only memory), a RAM 102 (random access memory), and a nonvolatile memory 103 are connected the main control unit 101. The ROM stores initial data for operating the unit 100 or a test pattern (not shown). The RAM 102 temporarily stores input image data or compensation data calculated in accordance with the outputs of the resist sensors 78 and 80. The nonvolatile memory 103 stores various compensation data obtained by an adjusting mode to be described later.

The timing control section 113 includes image memories 114 (Y, M, C, B), laser device sections 116 (Y, M, C, B), a

TABLE 4

| first mirror (33) | | | second mirror (35) | | | third mirror (37) | | | |
|---|---|---|---|---|---|---|---|---|---|
| rotation | front | inner portion | rotation | front | inner portion | rotation | front | inner portion | result |
| X | | | X | | | X | | | |
| X | | | X | | | | X | | |
| X | | | X | | | | | X | |
| X | | | | X | | X | | | |
| X | | | | X | | | X | | |
| X | | | | X | | | | X | |
| X | | | | | X | X | | | |
| X | | | | | X | | X | | |
| X | | | | | X | | | X | |
| | X | | X | | | X | | | |
| | X | | X | | | | X | | |
| | X | | X | | | | | X | |
| | X | | | X | | X | | | |
| | X | | | X | | | X | | |
| | X | | | X | | | | X | |
| | | X | X | | | X | | | |
| | | X | X | | | | X | | |
| | | X | X | | | | | X | |
| | | X | | X | | X | | | |
| | | X | | X | | | X | | |
| | | X | | X | | | | X | | resist compensation calculation unit 117, a timing setting unit 118, and voltage controlled oscillators (VCO) 119 (Y, M, C, B).

The image memories 114 store image data of the respective color separated components.

The laser drive sections 116 drive lasers 3 (Y, M, C, B) to provide irradiation of the laser beams to the respective photosensitive members 58 based on the respective image data stored in the image memories 114.

The resist compensation calculation unit 117 calculates an amount of compensation of timing for writing the image from the laser beams L (Y, M, C, B) based on the outputs of the first and second resist sensors 78 and 80.

The timing setting unit 118 defines timing for operating the respective mechanical elements of the respective image forming units 50 and the lasers 3 of the laser exposer unit 1.

The voltage controlled oscillators 119 correct an error of a length of a scanning line, which is peculiar to the respective image forming units 50, and a shift caused by each optical path of the laser exposer unit 1.

The timing control section 113 is a microprocessor including the RAM section for storing compensation data therein. The timing control section 113 is used in, for example, ASIC (Application Specific Integrated Circuit) based on the individual specification.

The respective data control sections 115 are microprocessors including a plurality of latch circuits and OR gates. The data control sections 115 are also used in, for example, ASIC.

The resist compensation calculation unit 117 is a microprocessor including at least four pairs of comparators and OR gate. Also, the resist compensation calculation unit 117 is used in, for example, ASIC.

The VOCs 119 are oscillators, which can vary a frequency to be output in accordance with the voltage to be applied. The VOCs 119 have a frequency variable range of about ±3%. As this type of oscillators, a harmonic oscillator, an LC oscillator, or a simulated reactance variable LC oscillator can be used. Moreover, as VOC 119, there is known a circuit device in which a converter for converting an output waveform from a sine wave to a rectangular wave is incorporated.

In the respective memories 114, image data, which is sent from an outer storage unit (not shown) or a host computer, is stored.

Moreover, the output of the horizontal sync detector 23 of the laser exposer unit 1 is converted to a horizontal sync signal H-sync through a horizontal sync signal generator 121, and input to the timing control section 113 and respective data control sections 115.

The following will explain an operation of the image forming unit 100 with reference to FIGS. 1 and 15.

The image forming 100 can be operated in two modes, that is, an image forming (normal) mode for forming an image on paper P transferred through the transfer belt 52, and a resist compensation (adjustment) mode for directly forming an image on the transfer belt 52.

The following will explain the resist compensation (adjustment) mode.

Figure 16:
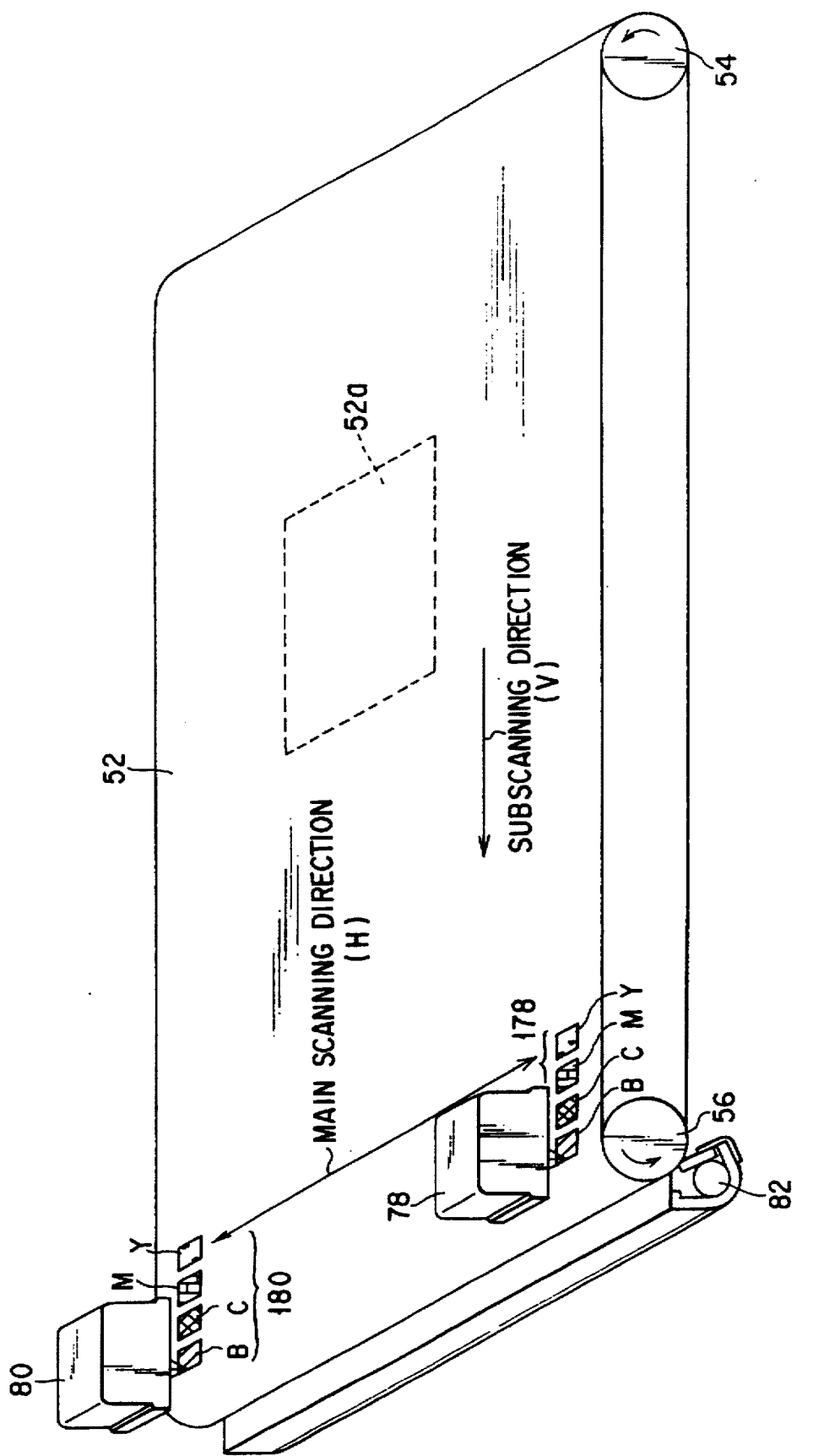
FIG. 16 is a schematic perspective view showing a method for matching timing of the image forming apparatus of FIG. 1 in the sub-scanning direction.

FIG. 16 is a perspective view showing a cut portion in the vicinity of the transfer belt of the image forming unit shown in FIG. 1 to explain the resist compensation mode. As already explained, the resist sensors 78 and 80 are arranged to have a predetermined interval in the width direction of the transfer belt 52, that is, the sub-scanning direction H. A line (imaginary line) connecting to the mutual center of the resist sensors 78 and 80 is defined to be substantially parallel to the axial line of the respective photosensitive members 58.

Preferably, the line connecting to the center of the resist sensors 78 and 80 is provided to be correctly parallel to the photosensitive member 58B of the image forming unit 50B.

The belt device roller 56 is rotated in the direction of an arrow, thereby the transfer belt 52 is moved to the direction where an area 52a is directed from the roller 54 to the roller 56 (hereinafter this direction called "sub-scanning direction H"). In the resist compensation mode, two pairs of test modes 178 (Y, M, C, B) and test modes 180 (Y, M, C, B) are formed on the transfer belt 52 to have a predetermined distance in a direction perpendicular to the sub-scanning direction H, that is, a main-scanning direction V. The test images 178 and 180 are formed to correspond to image data for resist adjustment, which is stored in ROM in advance. The test images 178 and 180 are moved along the sub-scanning direction H in accordance with the movement of the transfer belt 52, and passed through the resist sensors 78 and 80. As a result, a shift between the test images 178 and 180 and the resistor sensors 79 and 80 can be detected. In the resist compensation mode, the roller 72 for feeding paper P from the cassette 70 and the fixing unit 80 are maintained to be stopped.

More specifically, the first to fourth image forming units 50 (Y, M, C, B) are driven by the control of the main control unit 101, a predetermined voltage is applied onto the surface of each of the photosensitive members 58 of each of the image forming units 50. At the same time, the polygonal mirror 5a of the polygonal mirror unit 5 of the laser exposer unit 1 is rotated at a predetermined speed by the control of the image control CPU 111 of the image control section 110.

Sequentially, image data, which corresponds to the test image fetched from ROM, is fetched to the respective image memories 114 by the control of the image control CPU 111. Thereafter, a vertical sync signal V-sync is output from the timing control section 113 based on timing data, which is set by the timing setting unit 118, and resist compensation data, which is stored in the initial RAM of the timing control section 113. In a case where resist compensation data is not stored in the internal RAM, initial data stored in the ROM is used.

The vertical sync signal V-sync, which is output from the timing control section 113, is supplied to the respective data control sections 115.

The corresponding lasers 3 are operated by the corresponding laser drive sections 116, which are based on the vertical sync V-sync, and the laser beams L emitted from the lasers 3 are detected by the horizontal sync detector 23. Then, a predetermined clock numbers of the VC0 119 (initial data stored in the ROM is used till the output is input from the resist sensors 78 and 80) is counted after the horizontal signal H-sync is counted after the horizontal sync signal H-sync is output from the horizontal sync signal generator 121. At this time, oscillation frequency data, which is initial data stored in the ROM, is supplied to the respective VOCs 119. After counting the predetermined clock, image data stored in the image memories 114 is output by a predetermined timing.

Thereafter, by the control of the respective data control sections 115, a laser drive signal corresponding to image data is output to the respective lasers from the respective laser drive sections 116. Then, the laser beams L, which are intensity-modulated, are output from the respective lasers 3 based on image data. Therefore, the electrostatic latent image, which corresponds to test image data, is formed on the respective photosensitive members 58 of the respective image forming units 50 in which the predetermined voltage is set. By use of the respective developing units 62, the electrostatic latent image is developed with toner to which the corresponding color is provided, and converted to the toner image, which is paired of four colors.

Two test images, each which is paired of four colors Y, M, C, B) and formed on the respective photosensitive members 58, are transferred onto the transfer belt 52 through the transfer units 64, and delivered to the resist sensors 78 and 80. When two test toner images are passed through the resist sensors 78 and 80, the resist sensors 78 and 80 output a predetermined output, which corresponds to the relative position of the respective test toner images wherein the positions of the resist sensors 78 and 80 are set as a reference position, that is, the shift of the test toner images. The test toner images formed on the transfer belt 52 are further transferred with the rotation of the transfer belt 52, and removed by the belt cleaner 82.

The respective outputs from the resist sensors 78 and 80 are input to the resist compensation calculation unit 117 to be used in the calculation of the shift of the respective test toner images.

The resist compensation calculation unit 117 detects the shift of the position of each pair of test toner images of each color, that is, 178Y and 180Y, 178M and 180M, 178C and 180C, and 178B and 180B formed to be separated by a predetermined distance in the sub-scanning direction. After the detection, the unit 117 calculates the average value, and defines an amount of compensation Vr of timing to output the vertical sync signal V-sync based on the difference between the calculated average value and the predetermined design value. Whereby, the shift, which is caused by the overlap of four images, in the sub-scanning direction is removed. In other words, the light-emitting timing of the respective lasers 3 of the exposure unit 1 is adjusted. In other words, the shift, which is caused when the distances between the respective image forming units 50 are different from each other, are removed. Then, there is removed the shift between the respective laser beams L emitted from the laser exposer unit 1 in connection with the distance in the sub-scanning direction.

Moreover, the resist compensation calculation unit 117 detects the shift of the position of each of the test toner images 178 (Y, M, C, B) in the main-scanning direction. After the detection, the unit 117 calculates the average value, and defines an amount of compensation Hr of timing to output image data after the output of the horizontal sync signal H-sync based on the difference between the calculated average value and the predetermined design value. Whereby, there is adjusted timing in which the laser beams L, which are emitted from the respective lasers 3 of the laser exposer unit 1, are intensity-modulated by image data. In other words, the writing position of image data to be recorded onto the respective photosensitive members 58 of the respective image forming units 50 is adjusted in the main-scanning direction.

Furthermore, the resist compensation calculation unit 117 detects the shift of the position of each pair of test toner images of each other, that is, 178Y and 180Y, 178M and 180M, 178C and 180C, and 178B and 180B in the main-scanning direction. After the detection, the unit 117 calculates the average value, and defines an amount of compensation Fr of the oscillation frequency to be output from VOCs 119 based on the difference between the calculated average value and the predetermined design value.

Whereby, the length of the respective laser beams in the main-scanning direction per one clock, that is, the length of one line in the main-scanning direction to be image-formed on the respective photosensitive members 58, is adjusted.

The above amounts of compensation Vr, Hr, and Fr, that are obtained by the resist compensation calculation unit 117, are temporarily stored in the RAM of the timing control section 113. In this case, Vr, Hr, and Fr may be stored in the nonvolatile RAM 103. Moreover, these compensation operations are executed by the predetermined timing such as time when the compensation mode is selected by a control panel (not shown), time when a power supply switch (not shown) of the image forming unit 100 is turned on, or time when a number of papers to be printed, which is counted by a counter (not shown), reaches a predetermined number of papers.

The following will explain the image forming (normal) mode.

An image forming start signal is supplied by a control panel (not shown) or a host computer, so that the respective image forming units 50 are warmed up by the control of the main control unit 101, and the polygonal mirror 5a of the polygonal mirror unit 5 is rotated at a predetermined rotation speed by the control of the image control CPU 111.

Sequentially, image data to be printed is fetched to the RAM 102 from the outer memory unit, the host computer, or the scanner (image reading unit). A part (or all) of image data fetched into the RAM 102 is stored in each image memories 114 by the control of the image control CPU 111 of the image control unit 110. Moreover, the feeding roller 72 is driven by the control of the main control unit 101 in a state that a predetermined timing such a vertical sync signal v-sync is used as a reference, thereby one paper P is picked up from the paper cassette 70. Then, the respective toner images Y, M, C, and B, which are provided by the image forming units 50, and the timing are adjusted by the resist roller 74. The picked up paper P is adhered to the transfer belt 52 by the absorption roller 76, and guided to the respective image forming units 50 in accordance with the rotation of the transfer belt 52.

On the other hand, at the same time with the paper feeding and transferring operations, the vertical sync signal V-sync is outputted from the timing control unit 113 based on data set by the timing setting unit 118, resist data read from the internal RAM of the timing control unit 113, and clock data.

When the vertical sync signal V-sync is output from the timing control unit 113, the respective laser drive units 116 are driven by the respective data control units 115. Then, irradiation of each of the laser beams for one line in the main-scanning direction is provided to the respective photosensitive members 58 of the respective image forming units 50 form the respective lasers 3.

The number of clocks of the respective VCOs 119 is counted just after the input of the horizontal sync signal H-sync, which is generated by the horizontal sync signal generator 121, based on the laser beam for one line. When the number of clocks of the respective VCOs 119 reaches a predetermined value, image data to be printed read from the respective image memories 114. Sequentially, in order to intensity-modulate the respective laser beams from the respective lasers 3, image data is transferred to the respective laser drive units 116 by the control of the respective control units 115, so that an image having no shift is formed on the respective photosensitive members 58 of the respective image forming units 50.

As a result, the respective laser beams, which are guided to the respective photosensitive members 58, are correctly image-formed on the respective photosensitive members 58. At this time, no influence of the deviation of the optical path, which is from the respective lasers 3 to the respective photosensitive members 58, is exerted on the above image formation. Moreover, the above image formation is not influenced by the variation of the position of each photosensitive member 58, which is caused by the deviation of the diameter of the respective photosensitive members 58.

Each of the photosensitive members 58 is charged to a predetermined potential, and the potential is changed based on image data, whereby an electrostatic latent image corresponding to image data is formed on each of the photosensitive members 58. Each of the developing units 62 develops the electrostatic latent image with toner having a corresponding color to be converted to an toner image.

Each toner image is moved to paper P, which is delivered by the transfer belt 52, with the rotation of each of the photosensitive member 58, and transferred onto paper P on the transfer belt 62 at a predetermined timing by the transfer unit 64.

Whereby, the toner image in which four colors are correctly overlaid on paper P is transferred on paper P. After the toner image is transferred onto paper P, the residual toner and the residual voltage, which are left on the respective photosensitive members 58, are removed by the respective cleaners 66 and the respective discharge lamps 68 to be used in the sequential image formation.

Paper P in which the four-colored toner image is electrostatically maintained is further transferred with the rotation of the transfer belt 52, and separated from the transfer belt 52 by the difference between the curvature of the belt drive roller 56 and linearity of paper P to be guided to the fixing unit 84. Paper P guided to the fixing unit 84 is discharged to a discharge tray (not shown) after toner is melted and the toner image as a color image is fixed by the fixing unit 84.

On the other hand, the transfer belt 52 in which paper P is already supplied to the fixing unit 84 is further rotated. As a result, undesired toner left on the surface is removed by the belt cleaner 82, and the transfer belt 52 is used in the transfer of paper P to be supplied from the cassette 70.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical unit comprising:
   means for scanning a plurality of laser beams to an object to be scanned;
   means, having at least one of lens means, for focusing the plurality of the laser beams to pass through the lens means toward the object; and
   a plurality of mirror members, each mounted on a backward portion of the focusing means and arranged against each of the plurality of the laser beams, wherein the plurality of mirror members are capable of moving in at least one of parallel and rotary directions.

2. An optical unit according to claim 1, further comprising:
   means for holding the plurality of mirror members, each of the holding means has means for inclining each of the mirror members and means for shifting each of the mirror members, wherein the number of sets of the holding means to be deposited is more than four.

3. An optical unit according to claim 2, wherein more than two sets of the holding means are deposited to each of the laser beams.

4. An optical unit according to claim 1, wherein the number of sets of the focusing means is only one.

5. An optical unit according to claim 2, wherein at least one of mirror surfaces of each of the mirror members is held by a housing of the optical unit.

6. An optical exposer unit comprising:
   means for scanning a plurality of laser beams to an object to be scanned; and
   image-forming means for image-forming said laser beams scanned by said scanning means at a predetermined position of said scanning object,
   said image-forming means including:
   optical means, having a group of lenses, for providing a predetermined optical characteristic to each of said laser beams;
   a plurality of reflecting means provided between said optical means and said scanned object so as to correspond to each of said laser beams; and
   a plurality of glass plates provided to parallel-displace a corresponding one of said laser beams reflected by said reflecting means by a predetermined distance, said plurality of glass plates being provided at a final stage where said laser beams pass and being arranged such that the corresponding one of said laser beams is crossed at the predetermined angle with respect to others of said laser beams by the corresponding one of said glass plates.

7. The optical exposer unit according to claim 6, wherein each of said glass plates include a material satisfying $n \leq 1.7$ wherein n=a refractive index.

8. The optical exposer unit according to claim 6, further comprising means for supporting said reflecting means to be independently movable in parallel in a front and a back of a longitudinal direction of said reflecting means and to be rotatable at a center of the longitudinal direction.

9. The optical exposer unit according to claim 8, wherein each of said glass plates include a material satisfying $n \leq 1.7$ wherein n=a refractive index.

10. The optical exposer unit according to claim 8, wherein at least one of said glass plates is provided to form an angle of 90°+0.3° or more with each of said laser beams reflected by said reflecting means.

11. The optical exposer unit according to claim 8, wherein at least one of said glass plates is provided to form an angle of 90°−0.3° or more with each of said laser beams reflected by said reflecting means.

12. The optical exposer unit according to claim 6, wherein at least one of said glass plates is provided to form an angle of 90°+0.3° or more with each of said laser beams reflected by said reflecting means.

13. The optical exposer unit according to claim 6, wherein at least one of said glass plates is provided to form an angle of 90°−0.3° or more with each of said laser beams reflected by said reflecting means.

14. An optical exposer unit comprising:
   a first light source for emitting a first laser beam corresponding to a first image;
   a second light source for emitting a second laser beams corresponding to a second image;
   first optical means for combining the first and second laser beams with each other to be a light ray group serving as one flux of light ray;
   means for scanning the light ray group obtained by said first optical means to an object to be scanned;
   second optical means for separating the light ray group passed through said scanning means into the first and second laser beams, and providing a predetermined optical characteristic to each of the first and second laser beams such that each of the first and second laser beams has a predetermined cross sectional shape when each of the first and second laser beams reaches the scanning object;

means for reflecting the laser beams passed through said second optical means onto the scanning object; and third optical means being provided at a final stage where the laser beams pass and being arranged such that each of said laser beams is crossed at a predetermined angle with respect to others of said laser beams.

15. An image forming apparatus comprising:

a plurality of image carrier members;

an optical exposer unit having:
- a plurality of light sources provided to correspond to each of said image carrier members;
- means for scanning each of the laser beams emitted from the light sources to each of said corresponding image carrier members;
- image-forming means for image-forming the laser beams scanned by said scanning means at a predetermined position of said image carrier member, said image-forming means including:
- optical means having a set of lenses for providing a predetermined optical characteristic to each of the laser beams;
- a plurality of reflecting means provided between said optical means and said scanning object so as to correspond to each of the laser beams; and
- a plurality of glass plates provided to parallel-displace a corresponding one of the laser beams reflected by said reflecting means by a predetermined distance, said plurality of glass plates being provided at a final stage where said laser beams pass and being arranged such that the corresponding one of said laser beams is crossed at the predetermined angle with respect to others of said laser beams by the corresponding one of said glass plates; and developing units for supplying developer to latent images formed onto each of the image carrier members by said optical exposer unit so as to form developing images.

16. The optical exposer unit according to claim 15, wherein the first optical means comprises:

a plurality of finite focal lenses for receiving the first and second laser beams from the first and second light sources, respectively, and for providing first converged laser beams as an output, the first converged laser beams being converged in both a main-scanning direction and a sub-scanning direction that is perpendicular to the main-scanning direction;

a plurality of hybrid cylinder lenses each for receiving one of the first converged laser beams from a corresponding one of the finite focal lenses, and for providing second converged laser beams as an output, the second converged laser beams being further converged in only the sub-scanning direction; and a single mirror block for receiving the second converged laser beams and for bending all but one of the second converged laser beams in a direction towards the scanning means, wherein the one of the second converged laser beams is passed through in the direction towards the scanning means without any bending applied thereto.

17. The optical exposer unit according to claim 16, wherein the single mirror block, the plurality of finite focal lenses, and the plurality of hybrid cylinder lenses are all provided on a support member.

18. The optical exposer unit according to claim 16, wherein each of the hybrid cylinder lenses include a plastic cylinder lens and a glass cylinder lens, and wherein each of the plastic cylinder lenses and the glass cylinder lenses have substantially a same radius in the sub-scanning direction.

* * * * *